(12) United States Patent
Taylor et al.

(10) Patent No.: US 9,390,566 B2
(45) Date of Patent: Jul. 12, 2016

(54) APPARATUS, METHOD AND ARTICLE FOR PROVIDING VEHICLE EVENT DATA

(71) Applicant: Gogoro Inc., Hong Kong (CN)

(72) Inventors: Matthew Whiting Taylor, North Bend, WA (US); Hok-Sum Horace Luke, Mercer Island, WA (US)

(73) Assignee: Gogoro Inc., Hong Kong (CN)

( * ) Notice: Subject to any disclaimer, the term of this patent is extended or adjusted under 35 U.S.C. 154(b) by 0 days.

(21) Appl. No.: 14/536,042

(22) Filed: Nov. 7, 2014

(65) Prior Publication Data

US 2015/0134142 A1    May 14, 2015

Related U.S. Application Data

(60) Provisional application No. 61/901,660, filed on Nov. 8, 2013.

(51) Int. Cl.
*G07C 5/00* (2006.01)
*G07C 5/08* (2006.01)
*B60L 11/18* (2006.01)

(52) U.S. Cl.
CPC ............... *G07C 5/00* (2013.01); *G07C 5/0858* (2013.01); *B60L 11/1824* (2013.01); *G07C 5/008* (2013.01)

(58) Field of Classification Search
CPC ........ G07C 5/00; G07C 5/0858; G07C 5/008; B60L 11/1824
USPC ............................................................. 701/1
See application file for complete search history.

(56) References Cited

U.S. PATENT DOCUMENTS 1,387,848 A    8/1921    Good
3,470,974 A    10/1969   Pefine
(Continued)

FOREIGN PATENT DOCUMENTS

EP    0 693 813 A1    1/1996
EP    1 177 955 A2    2/2002
(Continued)

OTHER PUBLICATIONS

"Inrunner," retreived from URL=http://en.wikipedia.org/w/index.php?title=Inrunner&printable=yes on Sep. 28, 2011, 1 page.
(Continued)

*Primary Examiner* — Jerrah Edwards
*Assistant Examiner* — Frederick Brushaber
(74) *Attorney, Agent, or Firm* — Seed IP Law Group PLLC

(57) ABSTRACT

Detected events such as impacts, accidents, breakdowns, and types of driving behaviors based on feedback from tilt, gravity, accelerometers and/or shock sensors within a portable electrical power storage device such as a battery and/or within a vehicle (e.g., an electric scooter) are communicated to the user's mobile device, dashboard display and/or backend systems over wired and/or wireless communication channels. The communication of the events and types of events are logged and automatically aggregated from multiple vehicles for further analysis to determine various potential system-wide safety issues and to track event history on an individual per-user or individual per-scooter basis or individual per-battery basis. Such event data may also be transferred accordingly via the battery exchange process at the online exchange machine through a memory device attached to the battery that stores the event data.

7 Claims, 9 Drawing Sheets

(56) References Cited

U.S. PATENT DOCUMENTS

| | | | |
|---|---|---|---|
| 3,664,450 A | 5/1972 | Udden et al. |
| 3,678,455 A | 7/1972 | Levey |
| 4,087,895 A | 5/1978 | Etienne |
| 4,129,759 A | 12/1978 | Hug |
| 4,216,839 A | 8/1980 | Gould et al. |
| 4,669,570 A | 6/1987 | Perret |
| 5,187,423 A | 2/1993 | Marton |
| 5,189,325 A | 2/1993 | Jarczynski |
| 5,236,069 A | 8/1993 | Peng |
| 5,339,250 A | 8/1994 | Durbin |
| 5,349,535 A | 9/1994 | Gupta |
| 5,376,869 A | 12/1994 | Konrad |
| 5,544,784 A | 8/1996 | Malaspina |
| 5,596,261 A | 1/1997 | Suyama |
| 5,627,752 A | 5/1997 | Buck et al. |
| 5,631,536 A | 5/1997 | Tseng |
| 5,642,270 A | 6/1997 | Green et al. |
| 5,815,824 A | 9/1998 | Saga et al. |
| 5,839,800 A | 11/1998 | Koga et al. |
| 5,898,282 A | 4/1999 | Drozdz et al. |
| 5,998,963 A | 12/1999 | Aarseth |
| 6,016,882 A | 1/2000 | Ishikawa |
| 6,154,006 A | 11/2000 | Hatanaka et al. |
| 6,177,867 B1 | 1/2001 | Simon et al. |
| 6,177,879 B1 | 1/2001 | Kokubu et al. |
| 6,236,333 B1 | 5/2001 | King |
| 6,403,251 B1 | 6/2002 | Baggaley et al. |
| 6,498,457 B1 | 12/2002 | Tsuboi |
| 6,515,580 B1 | 2/2003 | Isoda et al. |
| 6,583,592 B2 | 6/2003 | Omata et al. |
| 6,593,713 B2 | 7/2003 | Morimoto et al. |
| 6,796,396 B2 | 9/2004 | Kamen et al. |
| 6,822,560 B2 | 11/2004 | Geber et al. |
| 6,854,773 B2 | 2/2005 | Lin |
| 6,899,268 B2 | 5/2005 | Hara |
| 6,952,795 B2 | 10/2005 | O'Gorman et al. |
| 7,010,682 B2 | 3/2006 | Reinold et al. |
| 7,111,179 B1 | 9/2006 | Girson et al. |
| 7,131,005 B2 | 10/2006 | Levenson et al. |
| 7,392,068 B2 | 6/2008 | Dayan et al. |
| 7,415,332 B2 | 8/2008 | Ito et al. |
| 7,426,910 B2 | 9/2008 | Elwart |
| 7,495,543 B2 | 2/2009 | Denison et al. |
| 7,567,166 B2 | 7/2009 | Bourgine De Meder |
| 7,592,728 B2 | 9/2009 | Jones et al. |
| 7,596,709 B2 | 9/2009 | Cooper et al. |
| 7,617,893 B2 | 11/2009 | Syed et al. |
| 7,698,044 B2 | 4/2010 | Prakash et al. |
| 7,728,548 B2 | 6/2010 | Daynes et al. |
| 7,761,307 B2 | 7/2010 | Ochi et al. |
| 7,778,746 B2 | 8/2010 | McLeod et al. |
| 7,863,858 B2 | 1/2011 | Gangstoe et al. |
| 7,868,591 B2 | 1/2011 | Phillips et al. |
| 7,898,439 B2 | 3/2011 | Bettez et al. |
| 7,908,020 B2 | 3/2011 | Pieronek |
| 7,923,144 B2 | 4/2011 | Kohn et al. |
| 7,948,207 B2 | 5/2011 | Scheucher |
| 7,979,147 B1 | 7/2011 | Dunn |
| 7,993,155 B2 | 8/2011 | Heichal et al. |
| 8,006,793 B2 | 8/2011 | Heichal et al. |
| 8,006,973 B2 | 8/2011 | Toba et al. |
| 8,013,571 B2 | 9/2011 | Agassi et al. |
| 8,035,341 B2 | 10/2011 | Genzel et al. |
| 8,035,349 B2 | 10/2011 | Lubawy |
| 8,063,762 B2 | 11/2011 | Sid |
| 8,068,952 B2 | 11/2011 | Valentine et al. |
| 8,098,050 B2 | 1/2012 | Takahashi |
| 8,106,631 B2 | 1/2012 | Abe |
| 8,118,132 B2 | 2/2012 | Gray, Jr. |
| 8,164,300 B2 | 4/2012 | Agassi et al. |
| 8,219,839 B2 | 7/2012 | Akimoto |
| 8,229,625 B2 | 7/2012 | Lal et al. |
| 8,265,816 B1 | 9/2012 | LaFrance |
| 8,301,365 B2 | 10/2012 | Niwa et al. |
| 8,319,605 B2 | 11/2012 | Hassan et al. |
| 8,326,259 B2 | 12/2012 | Gautama et al. |
| 8,354,768 B2 | 1/2013 | Cipriani |
| 8,355,965 B2 | 1/2013 | Yamada |
| 8,378,627 B2 | 2/2013 | Asada et al. |
| 8,412,401 B2 | 4/2013 | Bertosa et al. |
| 8,437,908 B2 | 5/2013 | Goff et al. |
| 8,447,598 B2 | 5/2013 | Chutorash et al. |
| 8,560,147 B2 | 10/2013 | Taylor et al. |
| 8,564,241 B2 | 10/2013 | Masuda |
| 8,614,565 B2 | 12/2013 | Lubawy |
| 8,798,852 B1* | 8/2014 | Chen ................ G06F 21/44 701/29.6 |
| 8,825,250 B2* | 9/2014 | Luke ................ H02J 7/00 180/65.1 |
| 9,104,537 B1* | 8/2015 | Penilla ................ G06F 17/00 |
| 9,124,085 B2* | 9/2015 | Wu ................ H02H 1/00 |
| 2001/0018903 A1 | 9/2001 | Hirose et al. |
| 2002/0023789 A1 | 2/2002 | Morisawa et al. |
| 2002/0070851 A1 | 6/2002 | Raichle et al. |
| 2003/0141840 A1 | 7/2003 | Sanders |
| 2003/0163434 A1 | 8/2003 | Barends |
| 2003/0209375 A1 | 11/2003 | Suzuki et al. |
| 2004/0236615 A1 | 11/2004 | Msndy |
| 2004/0246119 A1 | 12/2004 | Martin et al. |
| 2006/0047380 A1 | 3/2006 | Welch |
| 2006/0208850 A1 | 9/2006 | Ikeuchi et al. |
| 2006/0284601 A1 | 12/2006 | Salasoo et al. |
| 2007/0026996 A1 | 2/2007 | Ayabe et al. |
| 2007/0035397 A1 | 2/2007 | Patenaude et al. |
| 2007/0069687 A1 | 3/2007 | Suzuki |
| 2007/0090921 A1 | 4/2007 | Fisher |
| 2007/0145945 A1 | 6/2007 | McGinley et al. |
| 2007/0159297 A1 | 7/2007 | Paulk et al. |
| 2007/0208468 A1 | 9/2007 | Sankaran et al. |
| 2008/0276110 A1 | 11/2008 | Indiani et al. |
| 2009/0024872 A1 | 1/2009 | Beverly |
| 2009/0033456 A1 | 2/2009 | Castillo et al. |
| 2009/0082957 A1 | 3/2009 | Agassi et al. |
| 2009/0112394 A1 | 4/2009 | Lepejian et al. |
| 2009/0158790 A1 | 6/2009 | Oliver |
| 2009/0294188 A1 | 12/2009 | Cole |
| 2010/0026238 A1 | 2/2010 | Suzuki et al. |
| 2010/0051363 A1 | 3/2010 | Inoue et al. |
| 2010/0052588 A1 | 3/2010 | Okamura et al. |
| 2010/0089547 A1 | 4/2010 | King et al. |
| 2010/0094496 A1 | 4/2010 | Hershkovitz et al. |
| 2010/0114798 A1 | 5/2010 | Sirton |
| 2010/0156670 A1* | 6/2010 | Hamilton, II ........ G07B 15/06 340/928 |
| 2010/0161481 A1 | 6/2010 | Littrell |
| 2010/0198535 A1 | 8/2010 | Brown et al. |
| 2010/0198754 A1 | 8/2010 | Jones et al. |
| 2010/0201482 A1 | 8/2010 | Robertson et al. |
| 2010/0235043 A1 | 9/2010 | Seta et al. |
| 2010/0250043 A1 | 9/2010 | Scheucher |
| 2010/0308989 A1 | 12/2010 | Gasper |
| 2011/0025267 A1 | 2/2011 | Kamen et al. |
| 2011/0029157 A1 | 2/2011 | Muzaffer |
| 2011/0032110 A1 | 2/2011 | Taguchi |
| 2011/0071932 A1 | 3/2011 | Agassi et al. |
| 2011/0082621 A1 | 4/2011 | Berkobin et al. |
| 2011/0106329 A1 | 5/2011 | Donnelly et al. |
| 2011/0112710 A1 | 5/2011 | Meyer-Ebeling et al. |
| 2011/0114798 A1 | 5/2011 | Gemmati |
| 2011/0120789 A1 | 5/2011 | Teraya |
| 2011/0130906 A1* | 6/2011 | Mayer ................ G07C 5/008 701/22 |
| 2011/0130916 A1* | 6/2011 | Mayer ................ G07C 5/008 701/31.4 |
| 2011/0148346 A1 | 6/2011 | Gagosz et al. |
| 2011/0153141 A1 | 6/2011 | Beechie et al. |
| 2011/0160992 A1 | 6/2011 | Crombez |
| 2011/0169447 A1 | 7/2011 | Brown et al. |
| 2011/0200193 A1 | 8/2011 | Blitz et al. |
| 2011/0202476 A1 | 8/2011 | Nagy et al. |
| 2011/0218703 A1 | 9/2011 | Uchida |
| 2011/0224900 A1 | 9/2011 | Hiruta et al. |
| 2011/0260691 A1 | 10/2011 | Ishibashi et al. |
| 2011/0270480 A1 | 11/2011 | Ishibashi et al. |

(56) References Cited

U.S. PATENT DOCUMENTS

| | | |
|---|---|---|
| 2011/0279257 A1 | 11/2011 | Au et al. |
| 2011/0292667 A1 | 12/2011 | Meyers |
| 2011/0295454 A1 | 12/2011 | Meyers |
| 2011/0303509 A1 | 12/2011 | Agassi et al. |
| 2012/0000720 A1 | 1/2012 | Honda et al. |
| 2012/0019196 A1 | 1/2012 | Fung |
| 2012/0038473 A1 | 2/2012 | Fecher |
| 2012/0062361 A1 | 3/2012 | Kosugi |
| 2012/0068817 A1 | 3/2012 | Fisher |
| 2012/0078413 A1 | 3/2012 | Baker, Jr. |
| 2012/0105078 A1 | 5/2012 | Kikuchi et al. |
| 2012/0109519 A1 | 5/2012 | Uyeki |
| 2012/0123661 A1 | 5/2012 | Gray, Jr. |
| 2012/0126969 A1 | 5/2012 | Wilbur et al. |
| 2012/0157083 A1 | 6/2012 | Otterson |
| 2012/0158229 A1 | 6/2012 | Schaefer |
| 2012/0167071 A1 | 6/2012 | Paek |
| 2012/0194346 A1 | 8/2012 | Tsai et al. |
| 2012/0248868 A1 | 10/2012 | Mobin et al. |
| 2012/0248869 A1 | 10/2012 | Itagaki et al. |
| 2012/0253567 A1 | 10/2012 | Levy et al. |
| 2012/0256588 A1 | 10/2012 | Hayashi et al. |
| 2012/0259665 A1 | 10/2012 | Pandhi et al. |
| 2012/0271723 A1 | 10/2012 | Penilla et al. |
| 2012/0296512 A1 | 11/2012 | Lee et al. |
| 2012/0299537 A1 | 11/2012 | Kikuchi |
| 2012/0316671 A1 | 12/2012 | Hammerslag et al. |
| 2013/0024306 A1 | 1/2013 | Shah et al. |
| 2013/0026971 A1 | 1/2013 | Luke et al. |
| 2013/0026972 A1 | 1/2013 | Luke et al. |
| 2013/0026973 A1 | 1/2013 | Luke et al. |
| 2013/0027183 A1 | 1/2013 | Wu et al. |
| 2013/0030580 A1 | 1/2013 | Luke et al. |
| 2013/0030581 A1 | 1/2013 | Luke et al. |
| 2013/0030630 A1 | 1/2013 | Luke et al. |
| 2013/0030696 A1 | 1/2013 | Wu et al. |
| 2013/0030920 A1 | 1/2013 | Wu et al. |
| 2013/0031318 A1* | 1/2013 | Chen ................ H02J 7/00 711/154 |
| 2013/0033203 A1 | 2/2013 | Luke et al. |
| 2013/0046457 A1 | 2/2013 | Pettersson |
| 2013/0074411 A1 | 3/2013 | Ferguson et al. |
| 2013/0090795 A1 | 4/2013 | Luke et al. |
| 2013/0093271 A1 | 4/2013 | Luke et al. |
| 2013/0093368 A1 | 4/2013 | Luke et al. |
| 2013/0093384 A1 | 4/2013 | Nyu et al. |
| 2013/0116892 A1 | 5/2013 | Wu et al. |
| 2013/0119898 A1 | 5/2013 | Ohkura |
| 2013/0127416 A1 | 5/2013 | Karner et al. |
| 2013/0132307 A1 | 5/2013 | Phelps et al. |
| 2013/0179061 A1 | 7/2013 | Gadh et al. |
| 2013/0181582 A1 | 7/2013 | Luke et al. |
| 2013/0200845 A1 | 8/2013 | Bito |
| 2013/0221928 A1 | 8/2013 | Kelty et al. |
| 2013/0254097 A1 | 9/2013 | Marathe et al. |
| 2013/0282254 A1 | 10/2013 | Dwan et al. |
| 2014/0028089 A1 | 1/2014 | Luke et al. |
| 2014/0111121 A1 | 4/2014 | Wu |
| 2014/0142786 A1 | 5/2014 | Huang et al. |
| 2014/0163813 A1 | 6/2014 | Chen et al. |

FOREIGN PATENT DOCUMENTS

| | | |
|---|---|---|
| EP | 2 101 390 A2 | 9/2009 |
| EP | 2 230 146 A2 | 9/2010 |
| EP | 2 428 393 A1 | 3/2012 |
| JP | 07-031008 A | 1/1995 |
| JP | 7-36504 U | 7/1995 |
| JP | 9-119839 A | 5/1997 |
| JP | 10-170293 A | 6/1998 |
| JP | 10-307952 A | 11/1998 |
| JP | 11-049079 | 2/1999 |
| JP | 11-51681 A | 2/1999 |
| JP | 11-176487 A | 7/1999 |
| JP | 11-205914 A | 7/1999 |
| JP | 2000-102102 A | 4/2000 |
| JP | 2000-102103 A | 4/2000 |
| JP | 2000-341868 A | 12/2000 |
| JP | 2001-128301 | 5/2001 |
| JP | 2003-118397 | 4/2003 |
| JP | 2003-262525 A | 9/2003 |
| JP | 2005-67453 A | 3/2005 |
| JP | 2006-121874 A | 5/2006 |
| JP | 2007-60353 A | 3/2007 |
| JP | 2009-171646 A | 7/2009 |
| JP | 2009-171647 A | 7/2009 |
| JP | 4319289 B2 | 8/2009 |
| JP | 2010-022148 A | 1/2010 |
| JP | 2010-191636 A | 9/2010 |
| JP | 2010-200405 A | 9/2010 |
| JP | 2010-269686 A | 12/2010 |
| JP | 2011-126452 | 6/2011 |
| JP | 2011-131631 A | 7/2011 |
| JP | 2011-142704 A | 7/2011 |
| JP | 2012-151916 A | 8/2012 |
| KR | 1998-045020 U | 9/1998 |
| KR | 2004-0005146 A | 1/2004 |
| KR | 20100012401 A | 2/2010 |
| KR | 10-0971278 B1 | 7/2010 |
| KR | 20110004292 A | 1/2011 |
| KR | 20110041783 A | 4/2011 |
| KR | 20120020554 A | 3/2012 |
| TW | 200836452 A | 9/2008 |
| TW | I315116 B | 9/2009 |
| TW | M371880 U1 | 1/2010 |
| TW | M379269 U1 | 4/2010 |
| TW | M379789 U1 | 5/2010 |
| TW | M385047 U1 | 7/2010 |
| TW | 201043986 A1 | 12/2010 |
| TW | 201044266 A1 | 12/2010 |
| WO | 98/21132 A1 | 5/1998 |
| WO | 2009/039454 A1 | 3/2009 |
| WO | 2010/033517 A2 | 3/2010 |
| WO | 2010/143483 A1 | 12/2010 |
| WO | 2011/138205 A1 | 11/2011 |
| WO | 2012/085992 A1 | 6/2012 |
| WO | 2012/160407 A1 | 11/2012 |
| WO | 2012/160557 A2 | 11/2012 |
| WO | 2013/024483 A2 | 2/2013 |
| WO | 2013/024484 A1 | 2/2013 |
| WO | 2013/074819 A1 | 5/2013 |
| WO | 2013/080211 A1 | 6/2013 |
| WO | 2013/098873 A1 | 7/2013 |
| WO | 2013/102894 A1 | 7/2013 |
| WO | 2013/108246 A2 | 7/2013 |
| WO | 2013/118113 A2 | 8/2013 |
| WO | 2013/142154 A1 | 9/2013 |
| WO | 2013/144951 A1 | 10/2013 |

OTHER PUBLICATIONS

"Outrunner," retreived from URL=http://en.wikipedia.org/w/index.php?title=Outrunner&printable=yes on Sep. 16, 2011, 2 pages.

Chen et al., "Adjusting Electric Vehicle Systems Based on an Electrical Energy Storage Device Thermal Profile," U.S. Appl. No. 61/862,854, filed Aug. 6, 2013, 74 pages.

Chen et al., "Adjusting Electric Vehicle Systems Based on an Electrical Energy Storage Device Thermal Profile," U.S. Appl. No. 14/453,119, filed Aug. 6, 2014, 74 pages.

Chen et al., "Apparatus, System, and Method for Authentication of Vehicular Components," U.S. Appl. No. 61/783,041, filed Mar. 14, 2013, 84 pages.

Chen et al., "Apparatus, System, and Method for Authentication of Vehicular Components," Office Action mailed Nov. 22, 2013, for U.S. Appl. No. 13/918,703, 35 pages.

Chen et al., "Apparatus, System, and Method for Authentication of Vehicular Components," Notice of Allowance mailed Mar. 25, 2014, for U.S. Appl. No. 13/918,703, 7 pages.

Chen et al., "Apparatus, System, and Method for Authentication of Vehicular Components," U.S. Appl. No. 13/918,703, filed Jun. 14, 2013, 84 pages.

(56) References Cited

OTHER PUBLICATIONS

Chen et al., "Apparatus, Method and Article for Providing Vehicle Diagnostic Data," Office Action mailed Dec. 30, 2013, for U.S. Appl. No. 14/022,134, 20 pages.
Chen et al., "Apparatus, Method and Article for Providing Vehicle Diagnostic Data," Office Action mailed Apr. 9, 2014, for U.S. Appl. No. 14/022,134, 20 pages.
Chen et al., "Apparatus, Method and Article for Providing Vehicle Diagnostic Data," Notice of Allowance mailed Jul. 9, 2014, for U.S. Appl. No. 14/022,134, 10 pages.
Chen et al., "Apparatus, Method and Article for Providing Vehicle Diagnostic Data," Office Action mailed Jun. 18, 2014, for U.S. Appl. No. 13/559,390, 16 pages.
Chen et al., "Apparatus, Method and Article for Providing Vehicle Diagnostic Data," U.S. Appl. No. 14/022,134, filed Sep. 9, 2013, 61 pages.
Chen et al., "Apparatus, Method and Article for Providing Vehicle Diagnostic Data," U.S. Appl. No. 61/601,404, filed Feb. 21, 2012, 56 pages.
Chen et al., "Systems and Methods for Powering Electric Vehicles Using a Single or Multiple Power Cells," U.S. Appl. No. 61/862,852, filed Aug. 6, 2013, 46 pages.
Chen et al., "Systems and Methods for Powering Electric Vehicles Using a Single or Multiple Power Cells," U.S. Appl. No. 14/453,156, filed Aug. 6, 2014, 46 pages.
Communication pursuant to Rules 161(2) and 162 EPC, for corresponding European Patent Application No. 12817273.1, dated Mar. 25, 2014, 3 pages.
Communication pursuant to Rules 161(2) and 162 EPC, for corresponding European Patent Application No. 12817141.0, dated Mar. 26, 2014, 3 pages.
Communication pursuant to Rules 161(2) and 162 EPC, for corresponding European Patent Application No. 12818308.4, dated Mar. 26, 2014, 3 pages.
Communication pursuant to Rules 161(2) and 162 EPC, for corresponding European Patent Application No. 12817696.3, dated Mar. 27, 2014, 3 pages.
Communication pursuant to Rules 161(2) and 162 EPC, for corresponding European Patent Application No. 12817883.7, dated Mar. 27, 2014, 3 pages.
Communication pursuant to Rules 161(2) and 162 EPC, for corresponding European Patent Application No. 12818447.0, dated Mar. 27, 2014, 3 pages.
Huang et al., "Apparatus, Method and Article for Vehicle Turn Signals," U.S. Appl. No. 61/727,403, filed Nov. 16, 2012, 41 pages.
International Preliminary Report on Patentability and Written Opinion for corresponding International Patent Application No. PCT/US2012/048349, issued on Jan. 28, 2014, 5 pages.
International Preliminary Report on Patentability and Written Opinion for corresponding International Patent Application No. PCT/US2012/048354, issued on Jan. 28, 2014, 7 pages.
International Preliminary Report on Patentability and Written Opinion for corresponding International Patent Application No. PCT/US2012/048358, issued on Jan. 28, 2014, 5 pages.
International Preliminary Report on Patentability and Written Opinion for corresponding International Patent Application No. PCT/US2012/048366, issued on Jan. 28, 2014, 5 pages.
International Preliminary Report on Patentability and Written Opinion for corresponding International Patent Application No. PCT/US2012/048367, issued on Jan. 28, 2014, 4 pages.
International Preliminary Report on Patentability and Written Opinion for corresponding International Patent Application No. PCT/US2012/048375, issued on Jan. 28, 2014, 5 pages.
International Preliminary Report on Patentability and Written Opinion for corresponding International Patent Application No. PCT/US2012/048379, issued on Jan. 28, 2014, 5 pages.
International Preliminary Report on Patentability and Written Opinion for corresponding International Patent Application No. PCT/US2012/048380, issued on Jan. 28, 2014, 5 pages.
International Preliminary Report on Patentability and Written Opinion for corresponding International Patent Application No. PCT/US2012/048382, issued on Jan. 28, 2014, 5 pages.
International Preliminary Report on Patentability and Written Opinion for corresponding International Patent Application No. PCT/US2012/048391, issued on Jan. 28, 2014, 6 pages.
International Search Report and Written Opinion for corresponding International Patent Application No. PCT/US2012/048344, mailed Feb. 28, 2013, 9 pages.
International Search Report and Written Opinion for corresponding International Patent Application No. PCT/US2012/048347, mailed Dec. 18, 2012, 8 pages.
International Search Report and Written Opinion for corresponding International Patent Application No. PCT/US2012/048349, mailed Feb. 18, 2013, 9 pages.
International Search Report and Written Opinion for corresponding International Patent Application No. PCT/US2012/048354, mailed Feb. 18, 2013, 11 pages.
International Search Report and Written Opinion for corresponding International Patent Application No. PCT/US2012/048366, mailed Jan. 21, 2013, 10 pages.
International Search Report and Written Opinion for corresponding International Patent Application No. PCT/US2012/048367, mailed Jan. 17, 2013, 8 pages.
International Search Report and Written Opinion for corresponding International Patent Application No. PCT/US2012/048375, mailed Jan. 23, 2013, 9 pages.
International Search Report and Written Opinion for corresponding International Patent Application No. PCT/US2012/048379, mailed Dec. 17, 2012, 9 pages.
International Search Report and Written Opinion for corresponding International Patent Application No. PCT/US2012/048380, mailed Feb. 27, 2013, 9 pages.
International Search Report and Written Opinion for corresponding International Patent Application No. PCT/US2012/048382, mailed Feb. 27, 2013, 9 pages.
International Search Report and Written Opinion for corresponding International Patent Application No. PCT/US2012/063979, mailed Mar. 4, 2013, 10 pages.
International Search Report and Written Opinion for corresponding International Application No. PCT/US2012/048391, mailed Dec. 21, 2012, 9 pages.
International Search Report and Written Opinion for corresponding International Application No. PCT/US2012/058930, mailed Mar. 15, 2013, 11 pages.
International Search Report and Written Opinion for corresponding International Application No. PCT/US2013/070131, mailed Feb. 19, 2014, 17 pages.
International Search Report and Written Opinion for corresponding International Application No. PCT/US2013/065704, mailed Feb. 13, 2014, 13 pages.
International Search Report and Written Opinion for corresponding International Patent Application No. PCT/US2012/048358, mailed Feb. 25, 2013, 9 pages.
International Search Report and Written Opinion for corresponding International Application No. PCT/US2012/059931, mailed Mar. 29, 2013, 13 pages.
International Search Report and Written Opinion, for corresponding International Application No. PCT/US2014/021369, mailed Jul. 2, 2014, 14 pages.
International Search Report and Written Opinion, for corresponding International Application No. PCT/US2014/022610, mailed Jul. 10, 2014, 12 pages.
International Search Report and Written Opinion for corresponding International Application No. PCT/US2014/024757, mailed Jul. 11, 2014, 15 pages.
International Search Report and Written Opinion for corresponding International Application No. PCT/US2014/023539, mailed Sep. 4, 2014, 12 pages.
Luke et al., "Portable Electrical Energy Storage Device," U.S. Appl. No. 61/872,126, filed Aug. 30, 2013, 39 pages.
Luke et al., "Apparatus, Method and Article for Authentication, Security and Control of Portable Charging Devices and Power Storage

(56) References Cited

OTHER PUBLICATIONS

Devices, Such as Batteries," Office Action mailed Jan. 6, 2014, for U.S. Appl. No. 14/017,090, 19 pages.
Luke et al., "Apparatus, Method and Article for Authentication, Security and Control of Portable Charging Devices and Power Storage Devices, Such as Batteries," Office Action mailed Jun. 26, 2014, for U.S. Appl. No. 14/017,090, 19 pages.
Luke et al., "Apparatus, Method and Article for Authentication, Security and Control of Portable Charging Devices and Power Storage Devices, Such as Batteries," U.S. Appl. No. 14/017,090, filed Sep. 3, 2013, 69 pages.
Luke et al., "Apparatus, Method and Article for Authentication, Security and Control of Portable Charging Devices and Power Storage Devices, Such as Batteries," U.S. Appl. No. 61/773,621, filed Mar. 6, 2013, 69 pages.
Luke et al., "Apparatus, Method and Article for Providing Targeted Advertising in a Rechargeable Electrical Power Storage Device Distribution Environment," U.S. Appl. No. 61/773,614, filed Mar. 6, 2013, 77 pages.
Luke et al., "Detectible Indication of an Electric Motor Vehicle Standby Mode," Office Action for U.S. Appl. No. 13/646,320, mailed May 30, 2013, 13 pages.
Luke et al., "Detectible Indication of an Electric Motor Vehicle Standby Mode," U.S. Appl. No. 61/543,720, filed Oct. 5, 2011, 35 pages.
Luke et al., "Detectible Indication of an Electric Motor Vehicle Standby Mode," U.S. Appl. No. 61/684,432, filed Aug. 17, 2012, 41 pages.
Luke et al., "Drive Assembly for Electric Powered Device," U.S. Appl. No. 61/546,411, filed Oct. 12, 2011, 18 pages.
Luke et al., "Electric Device Drive Assembly and Cooling System," U.S. Appl. No. 61/615,144, filed Mar. 23, 2012, 43 pages.
Luke et al., "Modular System for Collection and Distribution of Electric Storage Devices," U.S. Appl. No. 14/202,589, filed Mar. 10, 2014, 76 pages.
Luke et al., "Modular System for Collection and Distribution of Electric Storage Devices," U.S. Appl. No. 61/789,065, filed Mar. 15, 2013, 76 pages.
Luke et al., "Apparatus, Method and Article for Authentication, Security and Control of Power Storage Devices, Such as Batteries, Based on User Profiles," U.S. Appl. No. 61/534,772, filed Sep. 14, 2011, 55 pages.
Luke et al., "Apparatus, Method and Article for Authentication, Security and Control of Power Storage Devices, Such as Batteries," Office Action mailed Feb. 26, 2014, for U.S. Appl. No. 13/559,038, 13 pages.
Luke et al., "Apparatus, Method and Article for Authentication, Security and Control of Power Storage Devices, Such as Batteries," Office Action mailed Aug. 19, 2014, for U.S. Appl. No. 13/559,038, 14 pages.
Luke et al., "Apparatus, Method and Article for Authentication, Security and Control of Power Storage Devices, Such as Batteries," Office Action mailed Feb. 25, 2014, for U.S. Appl. No. 14/023,344, 12 pages.
Luke et al., "Apparatus, Method and Article for Authentication, Security and Control of Power Storage Devices, Such as Batteries," Office Action mailed Aug. 21, 2014, for U.S. Appl. No. 14/023,344, 13 pages.
Luke et al., "Apparatus, Method and Article for Authentication, Security and Control of Power Storage Devices, Such as Batteries," U.S. Appl. No. 61/534,761, filed Sep. 14, 2011, 55 pages.
Luke et al., "Apparatus, Method and Article for Collection, Charging and Distributing Power Storage Devices, Such as Batteries," U.S. Appl. No. 61/511,900, filed Jul. 26, 2011, 73 pages.
Luke et al., "Apparatus, Method and Article for Collection, Charging and Distributing Power Storage Devices, Such as Batteries," U.S. Appl. No. 61/647,936, filed May 16, 2012, 76 pages.
Luke et al., "Apparatus, Method and Article for Redistributing Power Storage Devices, Such as Batteries, Between Collection, Charging and Distribution Machines," U.S. Appl. No. 61/534,753, filed Sep. 14, 2011, 65 pages.
Luke et al., "Dynamically Limiting Vehicle Operation for Best Effort Economy," Office Action for U.S. Appl. No. 13/559,264, mailed Aug. 14, 2013, 21 pages.
Luke et al., "Dynamically Limiting Vehicle Operation for Best Effort Economy," Office Action for U.S. Appl. No. 13/559,264, mailed Feb. 12, 2014, 24 pages.
Luke et al., "Dynamically Limiting Vehicle Operation for Best Effort Economy," Office Action for U.S. Appl. No. 13/559,264, mailed Aug. 19, 2014, 26 pages.
Luke et al., "Dynamically Limiting Vehicle Operation for Best Effort Economy," U.S. Appl. No. 61/511,880, filed Jul. 26, 2011, 52 pages.
Luke et al., "Thermal Management of Components in Electric Motor Drive Vehicles," Office Action mailed Apr. 2, 2014, for U.S. Appl. No. 13/559,259, 11 pages.
Luke et al., "Thermal Management of Components in Electric Motor Drive Vehicles," Notice of Allowance mailed Jul. 28, 2014, for U.S. Appl. No. 13/559,259, 7 pages.
Luke et al., "Thermal Management of Components in Electric Motor Drive Vehicles," U.S. Appl. No. 61/511,887, filed Jul. 26, 2011, 44 pages.
Luke et al., "Thermal Management of Components in Electric Motor Drive Vehicles," U.S. Appl. No. 61/647,941, filed May 16, 2012, 47 pages.
Luke, "Apparatus, Method and Article for Changing Portable Electrical Power Storage Device Exchange Plans," U.S. Appl. No. 14/204,587, filed Mar. 11, 2014, 56 pages.
Luke, "Apparatus, Method and Article for Changing Portable Electrical Power Storage Device Exchange Plans," U.S. Appl. No. 61/778,038, filed Mar. 12, 2013, 56 pages.
Luke, "Apparatus, Method and Article for Providing Information Regarding a Vehicle Via a Mobile Device," Office Action for U.S. Appl. No. 14/017,081, mailed Jan. 30, 2014, 36 pages.
Luke, "Apparatus, Method and Article for Providing Information Regarding a Vehicle Via a Mobile Device," Office Action for U.S. Appl. No. 14/017,081, mailed Jul. 21, 2014, 42 pages.
Luke, "Apparatus, Method and Article for Providing Information Regarding a Vehicle Via a Mobile Device," U.S. Appl. No. 14/017,081, filed Sep. 3, 2013, 81 pages.
Luke, "Apparatus, Method and Article for Providing Information Regarding a Vehicle Via a Mobile Device," U.S. Appl. No. 61/780,781, filed Mar. 13, 2013, 80 pages.
Microchip, "AN885: Brushless DC (BLDC) Motor Fundamentals," Microchip Technology Inc., 2003, 19 pages.
Park, "A Comprehensive Thermal Management System Model for Hybrid Electric Vehicles," Dissertation, The University of Michigan, 2011, 142 pages.
Taylor et al., "Apparatus, Method and Article for Physical Security of Power Storage Devices in Vehicles," Notice of Allowance for U.S. Appl. No. 13/559,054, mailed May 30, 2013, 32 pages.
Taylor et al., "Apparatus, Method and Article for Physical Security of Power Storage Devices in Vehicles," Office Action for U.S. Appl. No. 13/559,054, mailed Dec. 3, 2012, 11 pages.
Taylor et al., "Apparatus, Method and Article for Physical Security of Power Storage Devices in Vehicles," U.S. Appl. No. 14/012,845, filed Aug. 28, 2013, 64 pages.
Taylor et al., "Apparatus, Method and Article for Physical Security of Power Storage Devices in Vehicles," U.S. Appl. No. 61/557,170, filed Nov. 8, 2011, 60 pages.
Taylor et al., "Apparatus, Method and Article for Providing Vehicle Event Data," U.S. Appl. No. 61/901,660, filed Nov. 8, 2013, 58 pages.
Wu et al., "Apparatus, Mehtod and Article for Security of Vehicles," Office Action mailed Oct. 2, 2014, for U.S. Appl. No. 13/671,144, 20 pages.
Wu et al., "Battery Configuration for an Electric Vehicle," U.S. Appl. No. 61/716,388, filed Oct. 19, 2012, 37 pages.
Wu et al., "Apparatus, Method and Article for a Power Storage Device Compartment," Office Action for U.S. Appl. No. 13/559,125, mailed Feb. 24, 2014, 28 pages.

(56) References Cited

OTHER PUBLICATIONS

Wu et al., "Apparatus, Method and Article for a Power Storage Device Compartment," Office Action for U.S. Appl. No. 13/559,125, mailed Sep. 9, 2014, 28 pages.

Wu et al., "Apparatus, Method and Article for a Power Storage Device Compartment," U.S. Appl. No. 61/581,566, filed Dec. 29, 2011, 61 pages.

Wu et al., "Apparatus, Method and Article for Providing Information Regarding Availability of Power Storage Devices at a Power Storage Device Collection, Charging and Distribution Machine," U.S. Appl. No. 14/022,140, filed Sep. 9, 2013, 56 pages.

Wu et al., "Apparatus, Method and Article for Providing Information Regarding Availability of Power Storage Devices at a Power Storage Device Collection, Charging and Distribution Machine," Office Action mailed Mar. 5, 2014, for U.S. Appl. No. 14/022,140, 8 pages.

Wu et al., "Apparatus, Method and Article for Providing to a User Device Information Regarding Availability of Portable Electrical Energy Storage Devices at a Portable Electrical Energy Storage Device Collection, Charging and Distribution Machine," Notice of Allowance mailed Jun. 30, 2014, for U.S. Appl. No. 14/022,140, 5 pages.

Wu et al., "Apparatus, Method and Article for Providing to a User Device Information Regarding Availability of Partable Electrical Energy Storage Devices at a Portable Electrical Energy Storage Device Collection, Charging and Distribution Machine," U.S. Appl. No. 14/511,137, filed Oct. 9, 2014, 56 pages.

Wu et al., "Apparatus, Method and Article for Providing Information Regarding Availability of Power Storage Devices at a Power Storage Device Collection, Charging and Distribution Machine," U.S. Appl. No. 61/601,953, filed Feb. 22, 2012, 53 pages.

Wu et al., "Apparatus, Method and Article for Providing Locations of Power Storage Device Collection, Charging and Distribution Machines," Office Action for U.S. Appl. No. 13/559,333, mailed Jul. 3, 2013, 14 pages.

Wu et al., "Apparatus, Method and Article for Providing Locations of Power Storage Device Collection, Charging and Distribution Machines," Notice of Allowance mailed Jul. 10, 2014, for U.S. Appl. No. 13/559,333, 9 pages.

Wu et al., "Apparatus, Method and Article for Providing Locations of Power Storage Device Collection, Charging and Distribution Machines," Office Action mailed Nov. 19, 2013, for U.S. Appl. No. 14/022,147, 10 pages.

Wu et al., "Apparatus, Method and Article for Providing Locations of Power Storage Device Collection, Charging and Distribution Machines," Office Action mailed Nov. 27, 2013, for U.S. Appl. No. 13/559,333, 19 pages.

Wu et al., "Apparatus, Method and Article for Providing Locations of Power Storage Device Collection, Charging and Distribution Machines," U.S. Appl. No. 14/022,147, filed Sep. 9, 2013, 56 pages.

Wu et al., "Apparatus, Method and Article for Providing Locations of Power Storage Device Collection, Charging and Distribution Machines," Office Action mailed Mar. 5, 2014, for U.S. Appl. No. 14/022,147, 12 pages.

Wu et al., "Apparatus, Method and Article for Providing Locations of Power Storage Device Collection, Charging and Distribution Machines," Office Action mailed Aug. 6, 2014, for U.S. Appl. No. 14/022,147, 12 pages.

Wu et al., "Apparatus, Method and Article for Providing Locations of Power Storage Device Collection, Charging and Distribution Machines," U.S. Appl. No. 61/601,949, filed Feb. 22, 2012, 56 pages.

Wu et al., "Apparatus, Method and Article for Security of Vehicles," U.S. Appl. No. 61/557,176, filed Nov. 8, 2011, 37 pages.

Wu et al., "Apparatus, Method and Article for Power Storage Device Failure Safety," U.S. Appl. No. 14/071,134, filed Nov. 4, 2013, 68 pages.

Wu et al., "Apparatus, Method and Article for Power Storage Device Failure Safety," Office Action for U.S. Appl. No. 14/071,134, mailed Feb. 12, 2014, 14 pages.

Wu et al., "Apparatus, Method and Article for Power Storage Device Failure Safety," Office Action mailed Jun. 9, 2014, for U.S. Appl. No. 14/071,134, 15 pages.

International Search Report and Written Opinion, mailed Feb. 11, 2015, for corresponding International Application No. PCT/US2014/064616, 20 pages.

\* cited by examiner

APPARATUS, METHOD AND ARTICLE FOR PROVIDING VEHICLE EVENT DATA

BACKGROUND

1. Technical Field

The present disclosure generally relates to providing data and, more particularly, to providing vehicle event data, which may be suitable for use in a variety of fields or applications, for instance transportation and non-transportation uses.

2. Description of the Related Art

There are a wide variety of uses or applications for portable electrical power storage devices.

One such application is in the field of transportation. Hybrid and all electrical vehicles are becoming increasingly common. Such vehicles may achieve a number of advantages over traditional internal combustion engine vehicles. For example, hybrid or electrical vehicles may achieve higher fuel economy and may have little or even zero tail pipe pollution. In particular, all electric vehicles may not only have zero tail pipe pollution, but may be associated with lower overall pollution. For example, electrical power may be generated from renewable sources (e.g., solar, hydro). Also for example, electrical power may be generated at generation plants that produce no air pollution (e.g., nuclear plants). Also for example, electrical power may be generated at generation plants that burn relatively "clean burning" fuels (e.g., natural gas), which have higher efficiency than internal combustion engines, and/or which employ pollution control or removal systems (e.g., industrial air scrubbers) which are too large, costly or expensive for use with individual vehicles.

Personal transportation vehicles such as combustion engine powered scooters and/or motorbikes are ubiquitous in many places, for example in the many large cities of Asia. Such scooters and/or motorbikes tend to be relatively inexpensive, particularly as compared to automobiles, cars or trucks. Cities with high numbers of combustion engine scooters and/or motorbikes also tend to be very densely populated and suffer from high levels of air pollution. When new, many combustion engine scooters and/or motorbikes provide a relatively low polluting source of personal transportation. For instance, such scooters and/or motorbikes may have higher mileage ratings than larger vehicles. Some scooters and/or motorbikes may even be equipped with basic pollution control equipment (e.g., catalytic converter). Unfortunately, factory specified levels of emission are quickly exceeded as the scooters and/or motorbikes are used and either not maintained and/or as the scooters and/or motorbikes are modified, for example by intentional or unintentional removal of catalytic converters. Often owners or operators of scooters and/or motorbikes lack the financial resources or the motivation to maintain their vehicles.

It is known that air pollution has a negative effect on human health, being associated with causing or exacerbating various diseases (e.g., various reports tie air pollution to emphysema, asthma, pneumonia, cystic fibrosis as well as various cardiovascular diseases). Such diseases take large numbers of lives and severely reduce the quality of life of countless others.

BRIEF SUMMARY

A vehicle event data processing system may be summarized as comprising at least one controller and at least one memory device configured to be coupled to the at least one controller. The at least one controller may receive event data regarding the vehicle and store at least some of the event data in the memory device. The at least one controller may communicate at least some of the event data for display on a device. The at least one memory device may be configured to be coupled to the at least one controller when a portable electrical energy storage device is operably placed in the vehicle. The at least one controller may be attached to the electrical energy storage device. The device may be mobile device or a dashboard display of a vehicle, for example.

The at least one controller may be further configured to receive the event data regarding the vehicle from a vehicle event detection system of the vehicle. The at least one controller may be further configured to wirelessly receive the event data regarding the vehicle from the vehicle event detection system. The at least one memory device may be configured to be wirelessly coupled to the at least one controller. The at least one controller may be further configured to enable the at least some event data stored on the at least one memory device to be provided to an external device. The at least one controller may be at least one controller component of a mobile device. The at least one controller may receive the information regarding authentication via a wireless signal transmitted from the external device. The device is a portable electrical energy storage device collection, charging and distribution machine.

The vehicle event data processing system may further comprise a wireless communications module coupled to the at least one memory device. The wireless communications module may be configured to enable the at least some event data stored on the at least one memory device to be provided wirelessly to an external device. The event data may include at least some information regarding one or more of: an accident involving the vehicle, an emergency involving the vehicle, a breakdown of the vehicle, a catastrophic failure of the vehicle, a signal from a tilt sensor, a signal from a gravity sensor, a signal from an accelerometer, a signal from a shock sensor, temperature of the vehicle or vehicle components, temperature of a battery of the vehicle, temperature of a motor of the vehicle, temperature of an electronic component of the vehicle, data, signal or information from a temperature sensor, data, signal or information from a battery temperature sensor, dangerous temperature levels, temperature levels over or under one or more threshold temperatures, dangerous driving behavior, and one or more types of driving behaviors.

A vehicle event data processing system may be summarized as including: at least one controller; and at least one memory device configured to be coupled to the at least one controller, and wherein the at least one controller may: receive event data regarding the vehicle; store at least some of the event data in the memory device; and communicate at least some of the event data for display on a device.

The at least one memory device may be configured to be coupled to the at least one controller when a portable electrical energy storage device is operably placed in the vehicle. The at least one controller may be attached to the electrical energy storage device. The device may be a mobile device. The device may be a dashboard display of a vehicle. The at least one controller may be further configured to receive the event data regarding the vehicle from a vehicle event detection system of the vehicle. The at least one controller may be further configured to wirelessly receive the event data regarding the vehicle from the vehicle event detection system. The at least one memory device may be configured to be wirelessly coupled to the at least one controller. The at least one controller may be further configured to enable the at least some event data stored on the at least one memory device to be provided to an external device. The at least one controller may be at least one controller component of a mobile device. The at least one controller may be further configured to enable the at least some event data stored on the at least one memory device to be provided to an external device via a wired connection to the external device. The device may be a portable electrical energy storage device collection, charging and distribution machine.

The vehicle event data processing system may further include a wireless communications module coupled to the at least one memory device, and the wireless communications module may be configured to enable the at least some event data stored on the at least one memory device to be provided wirelessly to an external device.

The event data may include at least some information regarding one or more of: an accident involving the vehicle, an emergency involving the vehicle, a breakdown of the vehicle, a catastrophic failure of the vehicle, a signal from a tilt sensor, a signal from a gravity sensor, a signal from an accelerometer, a signal from a shock sensor, dangerous driving behavior, temperature of the vehicle or vehicle components, temperature of a battery of the vehicle, temperature of a motor of the vehicle, temperature of an electronic component of the vehicle, data, signal or information from a temperature sensor, data, signal or information from a battery temperature sensor, dangerous temperature levels, temperature levels over or under one or more threshold temperatures, and one or more types of driving behaviors. The at least one controller may communicate at least some of the event data for display on a device by communicating at least some of the event data to a display of a device including the controller.

A method in a vehicle event data processing system may be summarized as including: electronically receiving, by a processor of vehicle event data system, vehicle event data over a period of time longer than a day regarding one or more vehicles; electronically identifying, by a processor of the vehicle event data system, a specific vehicle, a specific user and a specific portable electrical energy storage device associated with respective events of a plurality of events indicated by the received event data; electronically receiving a request for information regarding a requested one of the specific vehicle, the specific user and the specific portable electrical energy storage device; and in response to the request, electronically provide, by a processor of vehicle event data system, the respective events of the plurality of events indicated by the received event data associated with the requested one of the specific vehicle, the specific user and the specific portable electrical energy storage device.

The method in a vehicle event data processing system may further include: electronically detecting, by a processor of the vehicle event data system, a pattern of safety problems regarding one or more of: a specific vehicle, a specific user and a specific portable electrical energy storage device associated with the respective events of the plurality of events based on the identification of the specific vehicle, the specific user and the specific portable electrical energy storage device associated with the respective events of the plurality of events indicated by the received event data.

The method in a vehicle event data processing system may further include: electronically communicating, by a processor of the vehicle event data system, information regarding the detected pattern of safety problems regarding the one or more of the specific vehicle, the specific user and the specific portable electrical energy storage device associated with the respective events of the plurality of events to a remote device.

The method in a vehicle event data processing system may further include: receiving a request for collection of a certain type of data by the vehicle with selectable parameters to aid in in-field diagnostics of the vehicle; and in response to the request, providing the certain type of data according to the selectable parameters.

The remote device may be a mobile device of the specific user. The detected pattern of safety problems may be regarding the specific portable electrical energy storage device and the method may further include electronically determining, by a processor of the vehicle event data system, a change to make regarding distribution of the specific portable electrical energy storage device to collection, charging and distribution machines based on the detected pattern of safety problems regarding the portable electrical energy storage device.

A non-transitory computer readable storage medium may be summarized as having computer executable instructions thereon that, when executed, cause a processor of a vehicle event data system to: receive event data from a sensor indicative of an impact to a portable electrical energy storage device in an electric vehicle; store at least some of the event data in one or more of: a memory device of the portable electrical energy storage device and a memory device of the vehicle; and communicate at least some of the event data for display on a device.

The non-transitory computer readable storage medium may have computer executable instructions thereon that, when executed, further cause a processor of the vehicle event data system to: electronically receive vehicle event data over a period of time longer than a day regarding the electric vehicle; electronically identify a specific user and a specific portable electrical energy storage device associated with respective events of a plurality of events indicated by the vehicle event data regarding the electric vehicle received over the period of time; and provide information regarding the identification of the specific user and the specific portable electrical energy storage device associated with the respective events of the plurality of events to a remote device.

BRIEF DESCRIPTION OF THE SEVERAL
VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with vending apparatus, batteries, supercapacitors or ultracapacitors, power converters including but not limited to transformers, rectifiers, DC/DC power converters, switch mode power converters, controllers, and communications systems and structures and networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

The use of ordinals such as first, second and third does not necessarily imply a ranked sense of order, but rather may only distinguish between multiple instances of an act or structure.

Reference to portable electrical power storage device means any device capable of storing electrical power and releasing stored electrical power including but not limited to batteries, supercapacitors or ultracapacitors. Reference to batteries means chemical storage cell or cells, for instance rechargeable or secondary battery cells including but not limited to gel lead-acid, absorbed glass mat lead acid, nickel cadmium alloy, nickel-zinc, nickel metal hydride or lithium ion battery cells.

The headings and Abstract of the Disclosure provided herein are for convenience only and do not interpret the scope or meaning of the embodiments.

Figure 1:
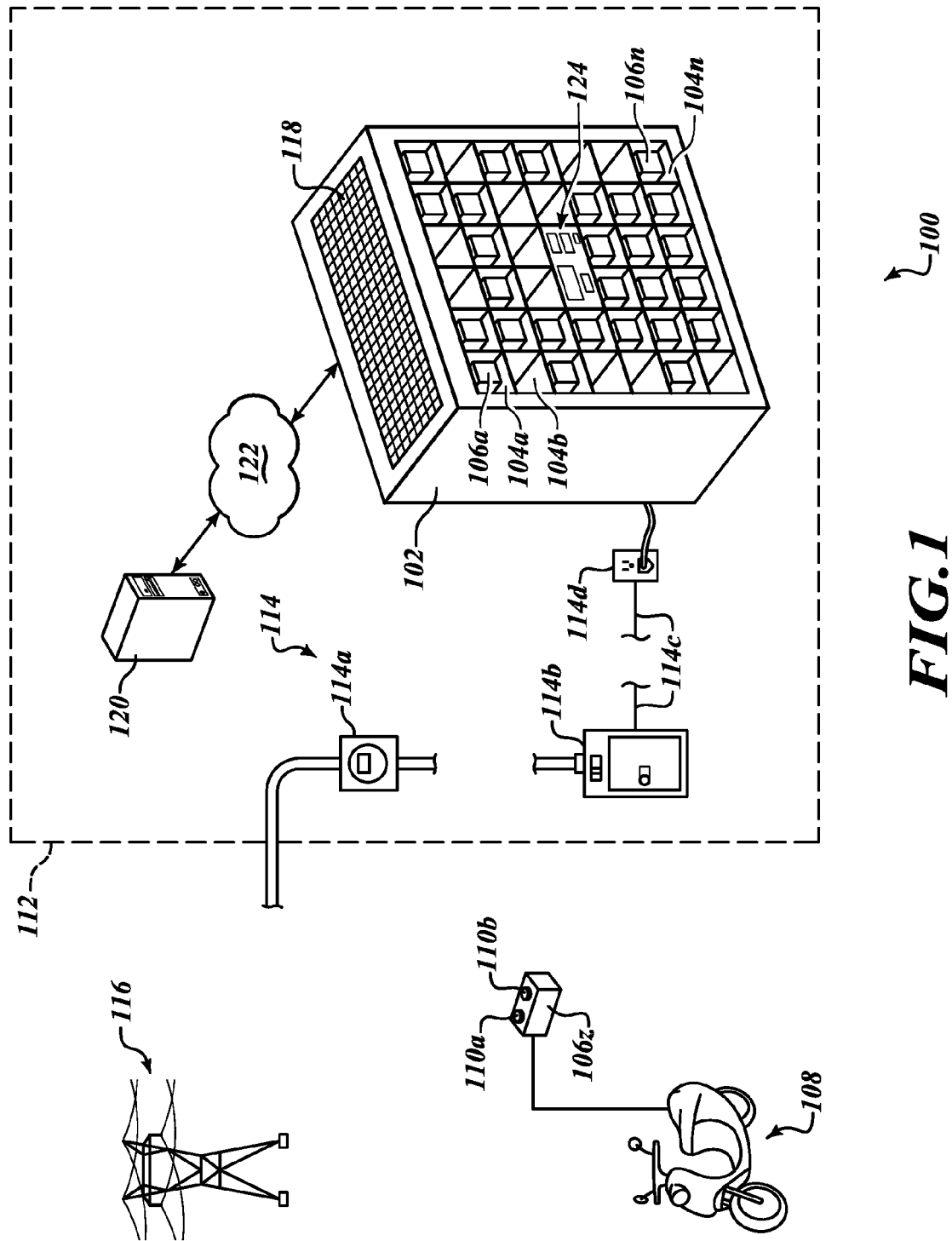
FIG. 1 is a schematic view of a collection, charging and distribution machine along with a number of portable electrical energy storage devices, an electric scooter or motorbike, and an electrical service provided via an electrical grid according to one non-limiting illustrated embodiment.

FIG. 1 shows an environment 100 including a collection, charging and distribution machine 102, according to one illustrated embodiment.

The collection, charging and distribution machine 102 may take the form of a vending machine or kiosk. The collection, charging and distribution machine 102 has a plurality of receivers, compartments or receptacles 104a, 104b-104n (only three called out in FIG. 1, collectively 104) to removably receive portable electrical energy storage devices (e.g., batteries, supercapacitors or ultracapacitors) 106a-106n (collectively 106) for collection, charging and distribution. As illustrated in FIG. 1, some of the receivers 104 are empty, while other receivers 104 hold portable electrical energy storage devices 106. While FIG. 1 shows a single portable electrical energy storage device 106 per receiver 104, in some embodiments each receiver 104 may hold two or even more portable electrical energy storage devices 106. For example, each of the receivers 104 may be sufficiently deep to receive three portable electrical energy storage devices 106. Thus, for example, the collection, charging and distribution machine 102 illustrated in FIG. 1 may have a capacity capable of simultaneously holding 40, 80 or 120 portable electrical energy storage devices 106.

The portable electrical energy storage devices 106 may take a variety of forms, for example batteries (e.g., array of battery cells), supercapacitors or ultracapacitors (e.g., array of ultracapacitor cells). For example, the portable electrical energy storage devices 106z may take the form of rechargeable batteries (i.e., secondary cells or batteries). The portable electrical energy storage devices 106z may, for instance, be sized to physically fit, and electrically power, personal transportation vehicles, such as all-electric scooters or motorbikes 108. As previously noted, combustion engine scooters and motorbikes are common in many large cities, for example in Asia, Europe and the Middle East. The ability to conveniently access charged batteries throughout a city or region may allow the use of all-electric scooters and motorbikes 108 in place of combustion engine scooters and motorbikes, thereby alleviating air pollution, as well as reducing noise.

The portable electrical energy storage devices 106 (only visible for portable electrical energy storage device 106z) may include a number of electrical terminals 110a, 110b (two illustrated, collectively 110), accessible from an exterior of the portable electrical energy storage device 106z. The electrical terminals 110 allow charge to be delivered from the portable electrical energy storage device 106z, as well as allow charge to be delivered to the portable electrical energy storage device 106z for charging or recharging the same. While illustrated in FIG. 1 as posts, the electrical terminals 110 may take any other form which is accessible from an exterior of the portable electrical energy storage device 106z, including electrical terminals positioned within slots in a battery housing. As the portable electrical energy storage devices 106 may be lent, leased, and/or rented out to the public, it is desirable to provide vehicle event data to the user of the vehicle in which portable electrical energy storage device 106z is currently being used, for example, for display on the user's mobile device or when the user exchanges or drops off portable electrical energy storage device 106z at a collection, charging and distribution machine 102. Systems and methods for providing vehicle event data are described in more detail below with reference to FIGS. 2-7, and are useful in the overall system for collection, charging and distribution of portable electrical energy storage devices 106 described herein.

The collection, charging and distribution machine 102 is positioned at some location 112 at which the collection, charging and distribution machine 102 is conveniently and easily accessible by various end users. The location may take any of a large variety of forms, for example, a retail environment such as a convenience store, supermarket, gas or petrol station, or service shop. Alternatively, the collection, charging and distribution machine 102 may stand alone at a location 112 not associated with an existing retail or other business, for example in public parks or other public places. Thus, for example, collection, charging and distribution machines 102 may be located at each store of a chain of convenience stores throughout a city or region. Such may advantageously rely on the fact that convenience stores are often sited or distributed based on convenience to the target population or demographic. Such may advantageously rely on pre-existing leases on storefronts or other retail locations to allow an extensive network of collection, charging and distribution machines 102 to be quickly developed in a city or region. Quickly achieving a large network which is geographically well distributed to serve a target population enhances the ability to depend on such a system and likely commercial success of such an effort.

The location 112 may include an electrical service 114 to receive electrical power from a generating station (not shown) for example via a grid 116. The electrical service 114 may, for example, include one or more of an electrical service meter 114a, a circuit panel (e.g., circuit breaker panel or fuse box) 114b, wiring 114c, and electrical outlet 114d. Where the location 112 is an existing retail or convenience store, the electrical service 114 may be an existing electrical service, so may be somewhat limited in rating (e.g., 120 volts, 240 volts, 220 volts, 230 volts, 15 amps).

Neither the operator of the retail location 112, nor the owner, distributor or operator of the collection, charging and distribution machine 102 may wish to bear the costs of upgrading the electrical service 114. Yet, quick charging is desired in order to maintain an adequate supply of portable electrical energy storage devices 106 available for use by end users. Optionally, the collection, charging and distribution machine 102 may include or be coupled to a source of renewable electrical power. For example, where installed in an outside location the collection, charging and distribution machine 102 may include an array of photovoltaic (PV) cells 118 to produce electrical power from solar insolation. Alternatively, the collection, charging and distribution machine 102 may be electrically coupled to a microturbine (e.g., wind turbine) or PV array positioned elsewhere at the location 112, for instance on a roof top or pole mounted at a top of a pole (not shown).

The collection, charging and distribution machine 102 may be communicatively coupled to one or more remotely located computer systems, such as back end or back office systems (only one shown) 120. The back end or back office systems 120 may collect data from and/or control a plurality of collection, charging and distribution machine 102 distributed about an area, such as a city. The communications may occur over one or more communications channels including one or more networks 122, or non-networked communications channels. Communications may be over one or more wired communications channels (e.g., twisted pair wiring, optical fiber), wireless communications channels (e.g., radio, microwave, satellite, 801.11 compliant). Networked communications channels may include one or more local area networks (LANs), wide area networks (WANs), extranets, intranets, or the Internet including the Worldwide Web portion of the Internet.

The collection, charging and distribution machine 102 may include a user interface 124. The user interface may include a variety of input/output (I/O) devices to allow an end user to interact with the collection, charging and distribution machine 102. Various I/O devices are called out and described in reference to FIG. 2, which follows.

Figure 2:
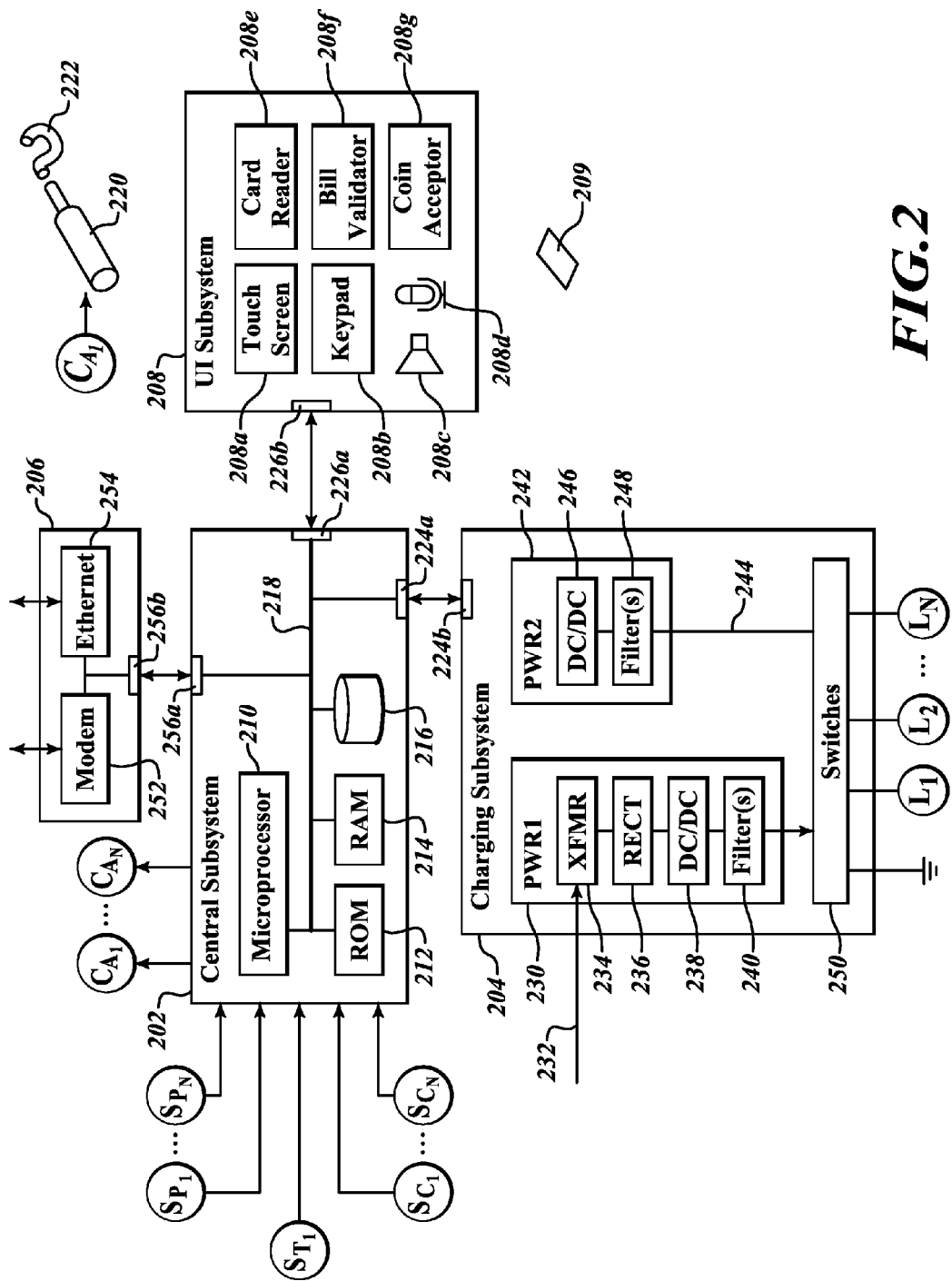
FIG. 2 is a block diagram of the collection, charging and distribution machine of FIG. 1, according to one non-limiting illustrated embodiment.

FIG. 2 shows the collection, charging and distribution machine 102 of FIG. 1, according to one illustrated embodiment.

The collection, charging and distribution machine 102 includes a control subsystem 202, a charging subsystem 204, a communications subsystem 206, and a user interface subsystem 208.

The control subsystem 202 includes a controller 210, for example a microprocessor, microcontroller, programmable logic controller (PLC), programmable gate array (PGA), application specific integrated circuit (ASIC) or another controller capable of receiving signals from various sensors, performing logical operations, and sending signals to various components. Typically, the controller 210 may take the form of a microprocessor (e.g., INTEL ATOM or ARM M3). The control subsystem 202 may also include one or more non-transitory processor- or computer-readable storage media, for example read only memory (ROM) 212, random access memory (RAM) 214, and data store 216 (e.g., solid-state storage media such as flash memory or EEPROM, spinning storage media such as hard disk). The non-transitory processor- or computer-readable storage media 212, 214, 216 may be in addition to any non-transitory storage medium (e.g., registers) which is part of the controller 210. The control subsystem 202 may include one or more buses 218 (only one illustrated) coupling various components together, for example one or more power buses, instruction buses, data buses, etc.

As illustrated, the ROM 212, or some other one of the non-transitory processor- or computer-readable storage media 212, 214, 216, stores instructions and/or data or values for variables or parameters. The sets of data may take a variety of forms, for example a lookup table, a set of records in a database, etc. The instructions and sets of data or values are executable by the controller 110. Execution of the instructions and sets of data or values causes the controller 110 to perform specific acts to cause the collection, charging and distribution machine 102 to collect, charge, and distribute portable energy storage devices. Specific operation of the collection, charging and distribution machine 102 is described herein and also below with reference to various flow diagrams (FIGS. 5-7) in the context of being an external device to charge the portable electrical energy storage devices 106 and provide information based on vehicle event data received from the portable electrical energy storage devices 106.

The controller 210 may use RAM 214 in a conventional fashion, for volatile storage of instructions, data, etc. The controller 210 may use data store 216 to log or retain information, for example, vehicle event data received from the portable electrical energy storage devices 106 and telemetric information related to collection, charging and/or distribution or collection of the portable electric power storage devices 106 and/or operation of the collection, charging and distribution machine 102 itself. The instructions are executable by the controller 210 to control operation of the collection, charging and distribution machine 102 in response to end user or operator input, and using data or values for the variables or parameters.

The control subsystem 202 receives signals from various sensors and/or other components of the collection, charging and distribution machine 102 which include information that characterizes or is indicative of operation, status, or condition of such other components. Sensors are represented in FIG. 2 by the letter S appearing in a circle along with appropriate subscript letters.

For example, one or more position sensors $S_{P1}$-$S_{PN}$ may detect the presence or absence of portable electrical power storage device 106 at each of the receivers 104. The position sensors $S_{P1}$-$S_{PN}$ may take a variety of forms. For example, the position sensors $S_{P1}$-$S_{PN}$ may take the form of mechanical switches that are closed, or alternatively opened, in response to contact with a portion of a respective portable electrical power storage device 106 when the portable electrical power storage device 106 is inserted into the receiver 104, or contact with a memory device of the portable electrical power storage device 106. Also for example, the position sensors $S_{P1}$-$S_{PN}$ may take the form of optical switches (i.e., optical source and receiver) that are closed, or alternatively opened, in response to contact with a portion of a respective portable electrical power storage device 106 when the portable electrical power storage device 106 is inserted into the receiver 104. Also for example, the position sensors $S_{P1}$-$S_{PN}$ may take the form of electrical sensors or switches that are closed, or alternatively opened, in response to detecting a closed circuit condition created by contact with the terminals 110 of a respective portable electrical power storage device 106 when the portable electrical power storage device 106 is inserted into the receiver 104, or an open circuit condition that results from the lack of a respective portable electrical power storage device 106 in the receiver 104. These examples are intended to be non-limiting, and it is noted that any other structures and devices for detecting the presence/absence or even the insertion of the portable electrical power storage devices 106 into receivers may be employed.

For example, one or more charge sensors $S_{C1}$-$S_{CN}$ may detect charge of the portable electrical power storage devices 106 at each of the receivers 104. Charge sensors $S_{C1}$-$S_{CN}$ may detect the amount of charge stored by the portable electrical power storage devices 106. Charge sensors $S_{C1}$-$S_{CN}$ may additionally detect an amount of charge and/or rate of charging being supplied to ones of the portable electrical power storage devices 106 at each of the receivers 104. Such may allow assessment of current (i.e., temporal) charge condition or status of each portable electrical power storage device 106, as well as allow feedback control over charging of same, including control over rate of charging. Charge sensors $S_{C1}$-$S_{CN}$ may include any variety of current and/or voltage sensors.

For example, one or more charge sensors $S_{T1}$ (only one shown) may detect or sense a temperature at the receivers 104 or in the ambient environment.

The control subsystem 202 provides signals to various actuators and/or other components responsive to control signals, which signals include information that characterizes or is indicative of an operation the component is to perform or a state or condition in which the components should enter. Control signals, actuators or other components responsive to control signals are represented in FIG. 2 by the letter C appearing in a circle along with appropriate subscript letters.

For example, one or more engine control signals $C_{A1}$-$C_{AN}$ may affect the operation of one or more actuators 220 (only one illustrated). For instance, a control signal $C_{A1}$ may cause movement of an actuator 220 between a first and a second position or change a magnetic field produced by the actuator 220. The actuator 220 may take any of a variety of forms, including but not limited to a solenoid, an electric motor such as a stepper motor, or an electromagnet. The actuator 220 may be coupled to operate a latch, lock or other retainer mechanism 222. The latch, lock or other retainer mechanism 222 may selectively secure or retain one or more portable electrical power storage devices 106 (FIG. 1) in the receiver 104 (FIG. 1). For instance, the latch, lock or other retainer mechanism 222 may physically couple to a complimentary structure that is part of a housing of the portable electrical power storage devices 106 (FIG. 1). Alternatively, the latch, lock or other retainer mechanism 222 may magnetically couple to a complimentary structure that is part of a housing of the portable electrical power storage devices 106 (FIG. 1). Also for instance, the latch, lock or other mechanism may open a receiver 104 (FIG. 1), or may allow a receiver 104 to be opened, to receive a partially or fully discharged portable electrical power storage device 106 for charging. For example, the actuator may open and/or close a door to the receiver 104 (FIG. 1), to selectively provide access to a portable electrical power storage device 106 (FIG. 1) received therein. Also, for example, the actuator may open and/or close a latch or lock, allowing an end user to open and/or close a door to the receiver 104 (FIG. 1), to selectively provide access to a portable electrical power storage device 106 (FIG. 1) received therein.

The control subsystem 202 may include one or more ports 224a to provide control signals to one or more ports 224b of the charging subsystem 206. The ports 224a, 224b may provide bi-directional communications. The control subsystem 202 may include one or more ports 226a to provide control signals to one or more ports 226b of the user interface subsystem 208. The ports 226a, 226b may provide bi-directional communications.

The charging subsystem 204 includes various electrical and electronic components to charge portable electrical power storage devices 106 when positioned or received in the receivers 104. For example, the charging subsystem 204 may include one or more power buses or power bus bars, relays, contactors or other switches (e.g., insulated gate bipolar transistors or IGBTs, metal oxide semiconductor transistors or MOSFETs), rectifier bridge(s), current sensors, ground fault circuitry, etc. The electrical power is supplied via contacts that can take any of a variety of forms, for instance terminals, leads, posts, etc. The contacts allow electrical coupling of various components. Some possible implementations are illustrated in FIG. 2. Such is not intended to be exhaustive. Additional components may be employed while other components may be omitted.

The illustrated charging subsystem 204 includes a first power converter 230 that receives electrical power from the electrical service 114 (FIG. 1) via a line or cord 232. The power will typically be in the form of single, two or three phase AC electrical power. As such, the first power converter 230 may need to convert and otherwise condition the electrical power received via the electrical services 114 (FIG. 1), for example for rectifying an AC waveform to DC, transforming voltage, current, phase, as well as reducing transients and noise. Thus, the first power converter 230 may include a transformer 234, rectifier 236, DC/DC power converter 238, and filter(s) 240.

The transformer 234 may take the form of any variety of commercially available transformers with suitable ratings for handling the power received via the electrical service 114 (FIG. 1). Some embodiments may employ multiple transformers. The transformer 234 may advantageously provide galvanic isolation between the components of the collection, charging and distribution machine 102 and the grid 116 (FIG. 1). The rectifier 236 may take any of variety of forms, for example a full bridge diode rectifier or a switch mode rectifier. The rectifier 236 may be operated to transform AC electrical power to DC electrical power. The DC/DC power converter 238 may be any of a large variety of forms. For example, DC/DC power converter 238 may take the form a switch mode DC/DC power converter, for instance employing IGBTs or MOSFETs in a half or full bridge configuration, and may include one or more inductors. The DC/DC power converter 238 may have any number of topologies including a boost converter, buck converter, synchronous buck converter, buck-boost converter or fly-back converter. The filter(s) 240 may include one or more capacitors, resistors, Zener diodes or other elements to suppress voltage spikes, or to remove or reduce transients and/or noise.

The illustrated charging subsystem 204 may also receive electrical power from a renewable power source, for example the PV array 118 (FIG. 1). Such may be converted or conditioned by the first power converter 230, for example being supplied directly to the DC/DC power converter 238, bypassing the transformer 236 and/or rectifier 236. Alternatively, the illustrated charging subsystem 204 may include a dedicated power converter to convert or otherwise condition such electrical power.

The illustrated charging subsystem 204 may optionally include second power converter 242 that receives electrical power from one or more portable electrical power storage devices 106 (FIG. 1) via one or more lines 244, for charging other ones of the portable electrical power storage devices 106. As such, the second power converter 242 may need to convert and/or otherwise condition the electrical power received from portable electrical power storage devices 106, for example optionally transforming voltage or current, as well as reducing transients and noise. Thus, the second power converter 242 may optionally include a DC/DC power converter 246 and/or filter(s) 248. Various types of DC/DC power converters and filters are discussed above.

The illustrated charging subsystem 204 includes a plurality of switches 250 responsive to the control signals delivered via ports 224a, 224b from the control subsystem 202. The switches may be operable to selectively couple a first number or set of portable electrical power storage devices 106 to be charged from electrical power supplied by both the electrical service via the first power converter 230 and from electrical power supplied by a second number or set of portable electrical power storage devices 106. The first number or set of portable electrical power storage devices 106 may include a single portable electrical power storage device 106, two, or even more portable electrical power storage devices 106. The second number or set of portable electrical power storage devices 106 may include a single portable electrical power storage device 106, two, or even more portable electrical power storage devices 106. The portable electrical power storage devices 106 are represented in FIG. 2 as loads $L_1$, $L_2$-$L_N$.

The communications subsystem 206 may additionally include one or more communications modules or components which facilitate communications with the various components of a back end or back office system 120 (FIG. 1) and/or various components of the portable electrical power storage devices 106. The communications subsystem 206 may, for example, include one or more modems 252 or one or more Ethernet or other types of communications cards or components 254. A port 256a of the control subsystem 202 may communicatively couple the control subsystem 202 with a port 256b of the communications subsystem 206. The communications subsystem 206 may provide wired and/or wireless communications. For example, the communications subsystem 206 may provide components enabling short range (e.g., via Bluetooth, near field communication (NFC), radio frequency identification (RFID) components and protocols) or longer range wireless communications (e.g., over a wireless LAN, satellite, or cellular network) with various other devices external to the collection, charging and distribution machine 102, including the portable electrical energy storage devices 106. The communications subsystem 206 may include one or more ports, wireless receivers, wireless transmitters or wireless transceivers to provide wireless signal paths to the various remote components or systems. The remote communications subsystem 206 may include one or more bridges or routers suitable to handle network traffic including switched packet type communications protocols (TCP/IP), Ethernet or other networking protocols.

The user interface system 208 includes one or more user input/output (I/O) components. For example, user interface system 208 may include a touch screen display 208a, operable to present information and a graphical user interface (GUI) to an end user and to receive indications of user selections. The user interface system 208 may include a keyboard or keypad 208b, and/or a cursor controller (e.g., mouse, trackball, trackpad) (not illustrated) to allow an end user to enter information and/or select user selectable icons in a GUI. The user interface system 208 may include a speaker 208c to provide aural messages to an end user and/or a microphone 208d to receive spoken user input such as spoken commands.

The user interface system 208 may include a card reader 208e to read information from card type media 209. The card reader 208e may take a variety of forms. For instance, the card reader 208e may take the form of, or include, a magnetic stripe reader for reading information encoded in a magnetic stripe carried by a card 209. For instance, the card reader 208e may take the form of, or include, a machine-readable symbol (e.g., barcode, matrix code) card reader for reading information encoded in a machine-readable symbol carried by a card 209. For instance, the card reader 208e may take the form of, or include, a smart card reader for reading information encoded in a non-transitory medium carried by a card 209. Such may, for instance, include media employing radio frequency identification (RFID) transponders or electronic payment chips (e.g., near filed communications (NFC) chips). Thus, the card reader 208e may be able to read information from a variety of card media 209, for instance credit cards, debit cards, gift cards, prepaid cards, as well as identification media such as drivers licenses. The card reader 208e may also be able to read information encoded in a non-transitory medium carried by the portable electrical energy storage devices 106, and may also include RFID transponders, transceivers, NFC chips and/or other communication devices to communicate information to the portable electrical energy storage devices 106 (e.g., for authentication of the portable electrical energy storage devices 106 and/or authentication of the collection, charging and distribution machine 102 to the portable electrical energy storage devices 106).

The user interface system 208 may include a bill acceptor 208f and a validator and/or coin acceptor 208g to accept and validate cash payments. Such may be highly useful in servicing populations who lack access to credit. Bill acceptor and validator 208f and/or coin acceptor 208g may take any variety of forms, for example those that are currently commercially available and used in various vending machines and kiosks.

Figure 3A:
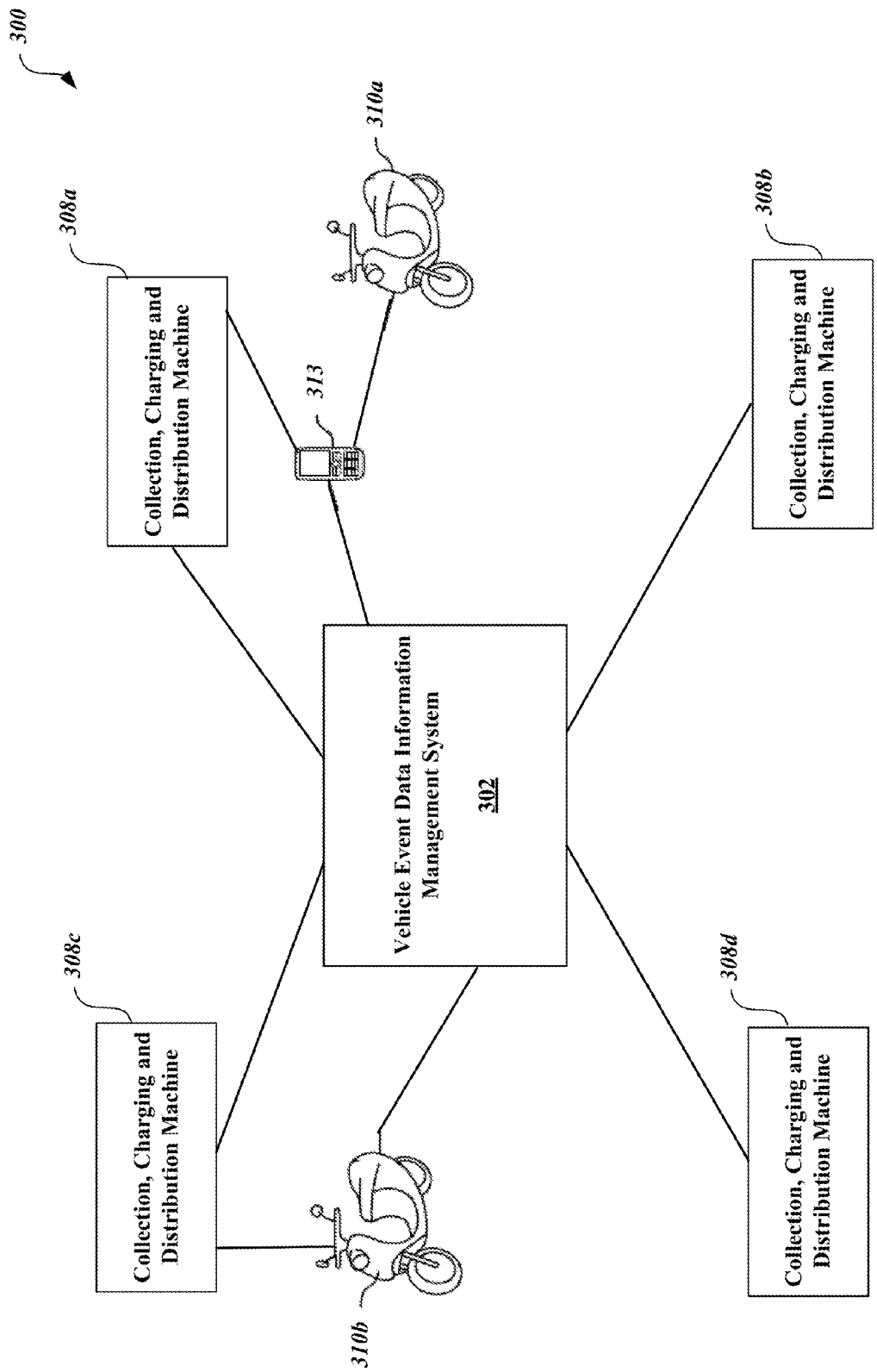
FIG. 3A is a block diagram of a system for providing vehicle event data which shows collection, charging and distribution machines, such as that of FIG. 1, within the system, according to one non-limiting illustrated embodiment.

FIG. 3A is a block diagram of a system for providing vehicle event data which shows collection, charging and distribution machines 308a to 308d, such as that of FIG. 1, within the system, according to one non-limiting illustrated embodiment.

Shown is a vehicle data information management system 302 for providing vehicle event data via a mobile device, such as, for example, mobile device 313. For example, the vehicle data information management system 302 may provide information regarding one or more of: an accident involving the vehicle, an emergency involving the vehicle, a breakdown of the vehicle, a catastrophic failure of the vehicle, a signal from a tilt sensor, a signal from a gravity sensor, a signal from an accelerometer, a signal from a shock sensor, temperature of the vehicle or vehicle components, temperature of a battery of the vehicle, temperature of a motor of the vehicle, temperature of an electronic component of the vehicle, data, signal or information from a temperature sensor, data, signal or information from a battery temperature sensor, dangerous temperature levels, temperature levels over or under one or more threshold temperatures, dangerous driving behavior, and one or more types of driving behaviors, etc. Such sensors may be located in or attached to the portable electrical energy storage device of the vehicle (e.g., vehicle 310a) or other locations in the vehicle. Once generated by such sensors, this information may be communicated to and/or received from one or any combination of the items shown in FIG. 3, including the example collection, charging and distribution machines 308a, 308b, 308c and 308d, the mobile device 313 itself, the vehicle data information management system 302, and/or the vehicle (e.g., electric scooter 310a or 310b).

Figure 3B:
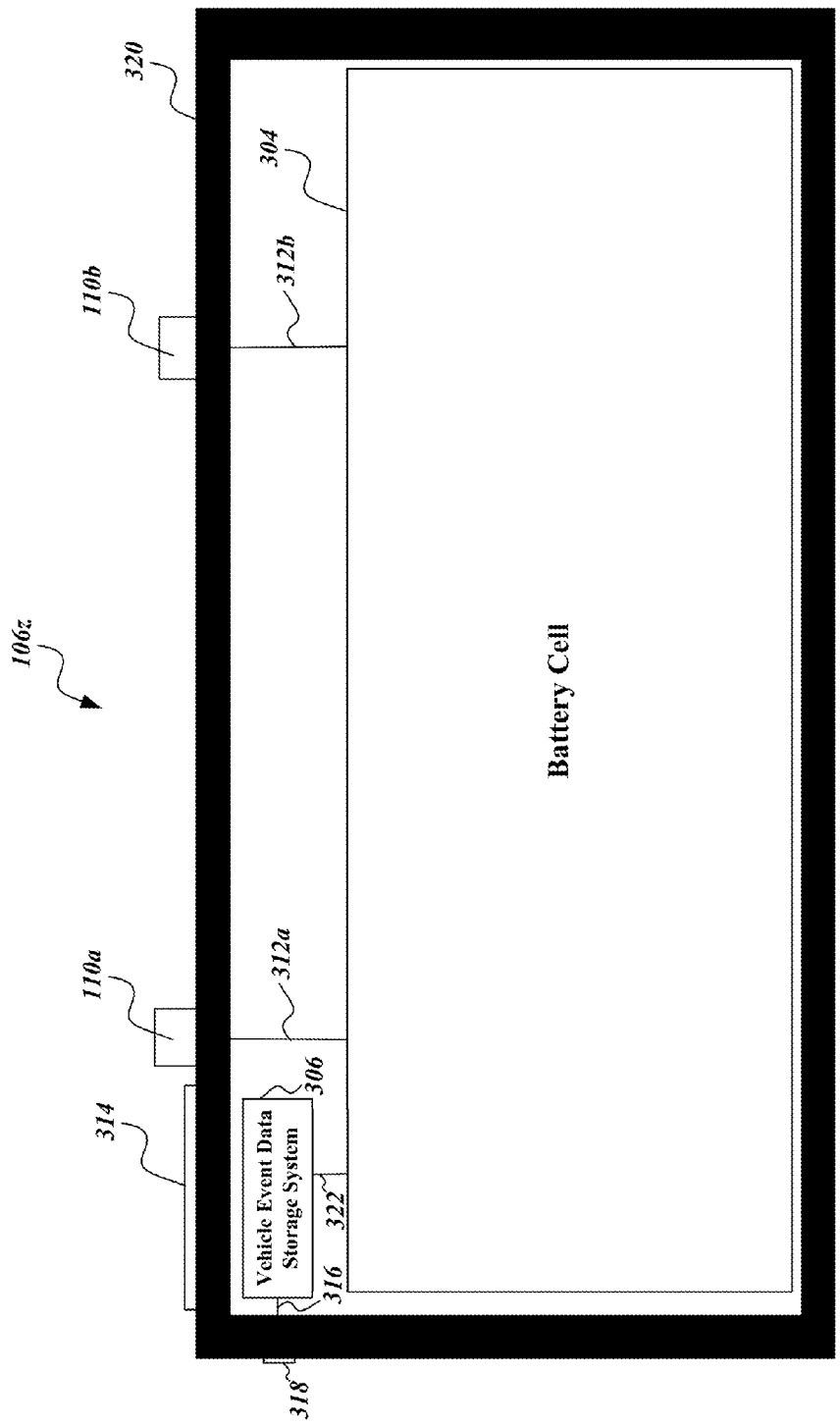
FIG. 3B is a block diagram of the portable electrical energy storage device of FIG. 1, according to one non-limiting illustrated embodiment.

This may include information received from a memory module attached to the portable electrical energy storage device of the electric scooter 310a or 310b (see FIG. 3B). This also may include information received from a memory module attached to or associated with the vehicle 310a or 310b, (e.g., a memory module of a subsystem or control system of vehicle 310a or 310b that stores or is configured to store vehicle event data and possibly other information, etc.). For example, this may include information received from or stored in any memory module storing or configured to store at least some information regarding one or more of: an accident involving the vehicle, an emergency involving the vehicle, a breakdown of the vehicle, a catastrophic failure of the vehicle, a signal from a tilt sensor, a signal from a gravity sensor, a signal from an accelerometer, a signal from a shock sensor, temperature of the vehicle or vehicle components, temperature of a battery of the vehicle, temperature of a motor of the vehicle, temperature of an electronic component of the vehicle, data, signal or information from a temperature sensor, data, signal or information from a battery temperature sensor, dangerous temperature levels, temperature levels over or under one or more threshold temperatures, dangerous driving behavior, and one or more types of driving behaviors, etc.

This information above may be received directly or indirectly from such a memory module described above. For example, this information may be received by a memory module attached to the portable electrical energy storage device of the electric scooter 310a from one or more systems of vehicle 310a and/or other memory module as described above (including, but not limited to: such a memory module of the user mobile device 313; of one or more collection, charging and distribution machines 308a-308d, of the vehicle data information management system 302, of another vehicle 310b, etc.). This information may also be received indirectly from the memory module via any one of the communication systems of the items in the system 300 shown in FIG. 3. For example, the data regarding the vehicle 310a described herein may be communicated to, stored in and communicated from the memory module, or the like, in the diagnostic data storage system attached to the portable electrical energy storage device of vehicle 310a as described in U.S. Provisional Patent Application Ser. No. 61/601,404 entitled "APPARATUS, METHOD AND ARTICLE FOR PROVIDING VEHICLE DIAGNOSTIC DATA" and filed on Feb. 21, 2012, and/or described in U.S. patent application Ser. No. 13/559,390 also entitled "APPARATUS, METHOD AND ARTICLE FOR PROVIDING VEHICLE DIAGNOSTIC DATA" and filed on Jul. 26, 2012, both of which are hereby incorporated by reference in their entireties. In some embodiments, the vehicle data information management system 302, or parts or subcomponents thereof, may be the back end or back office system 120 shown in FIG. 1. In other embodiments, the vehicle data information management system 302 may be part of or may be in operable communication with, the back end or back office system 120 shown in FIG. 1.

The vehicle data information management system 302 is in operable communication with the collection, charging and distribution machines 308a, 308b, 308c and 308d, and one or more user mobile communication devices 313 (only one shown as an example), such that data may be exchanged between the vehicle data information management system 302, the collection, charging and distribution machines 308a, 308b, 308c and 308d, and the user mobile communication device 313. In some embodiments, such exchange of data may be accomplished via storage of such data on a memory module attached to a portable electrical energy storage device used by the vehicle which is exchanged at one or more of collection, charging and distribution machines 308a, 308b, 308c and 308d (see FIG. 3B). Also, the vehicle data information management system 302, the collection, charging and distribution machines 308a, 308b, 308c and 308d, and the user mobile communication device 313 may, in some embodiments, additionally or instead be in operable communication directly with each other.

This communication between the various items, systems and entities of FIG. 3A is enabled by the various communications subsystems of these various items, systems and entities. For example, this communication may be enabled by the various communications subsystems of the distribution machines 308a, 308b, 308c and 308d, the vehicle data information management system 302, the vehicles 310a and 310b, and the user mobile communications device 313. One or more of such communication subsystems may provide wired and/or wireless communications (e.g., cellular, local area network connections, and/or short range wireless connections using or being compatible with any operable communications protocol and/or standard). The communications subsystems of the items in FIG. 3A may include one or more ports, wireless receivers, wireless transmitters or wireless transceivers to provide wireless signal paths to the various remote components or systems. The remote communications subsystems may include one or more bridges or routers suitable to handle network traffic including switched packet type communications protocols (TCP/IP), Ethernet or other networking protocols.

For example, the vehicle data information management system 302 may receive an update from collection, charging and distribution machine 308c regarding an event involving the vehicle (e.g., an accident or impact) of the vehicle and/or usage history of the vehicle. In some embodiments, the vehicle data information management system 302 may continually or periodically monitor the collection, charging and distribution machines or other items shown in FIG. 3 to obtain such information. Also, the collection, charging and distribution machines may continually or periodically provide updates to the vehicle data information management system 302 regarding the vehicle event data. This information may be provided to mobile device 313, vehicle 310a, and/or vehicle 310b continuously, periodically, aperiodically and/or or in response to a request for such information from mobile device 313, vehicle 310a, and/or vehicle 310b. For example, vehicle event data regarding vehicle 310a may be provided to mobile device 313 and/or vehicle 310a in response to the mobile device 313 or vehicle 310a being detected by the vehicle data information management system 302, or by collection, charging and distribution machine 308a, as being within close proximity to collection, charging and distribution machine 308a.

An alert may be sent to the mobile device 313 or vehicle 310a (e.g., via a text message, email, instant message, status update on a social media network, automated phone call, as a notification within a specific application, etc.) regarding an event involving vehicle (e.g., an accident or impact) etc., based on the vehicle event data. This alert may be sent via any variety of communications channels including, but not limited to, cellular telephone networks, computer wireless fidelity (Wi-Fi) networks, satellite networks, short range wireless signals, etc., or any operable combination thereof.

The alert may also include a selectable link, icon or other user interface element that the user may select to receive further information regarding what to do in case of an event such as the one detected based on the vehicle event data or otherwise act on the information communicated in the alert. For example, information regarding, a link to, or contact information regarding emergency services, towing services, insurance services, police, and/or vehicle or portable electrical energy storage device replacement or repair may be provided. This information or access thereto may be stored in a database maintained centrally by the vehicle data information management system 302 and/or locally at the selected collection, charging and distribution machine.

Any item of FIG. 3 may identify, authenticate, verify or otherwise facilitate such operations via the user interface of the vehicle, the mobile device, and/or or collection, charging and distribution machine by the user inputting particular user credentials, a password, biometric data, a user identification number or code, and/or by the card reader 208e described above, etc. Also, any item of FIG. 3 may additionally or alternatively identify, authenticate, verify or otherwise facilitate such operations via information received from a user security token (not shown), mobile device 313 or other item associated with the user. The vehicle event data may be communicated and organized in any manner including in a list, as a group of selectable icons, etc., that indicates information based on the vehicle data.

In some embodiments, various options and features regarding available portable electrical energy storage devices may be generated and made available to the user. For example, a specific user's, a specific vehicle's and/or a specific portable electrical energy storage device's safety record may be determined, stored and/or communicated based on the corresponding vehicle event data aggregated by the vehicle data information management system 302.

The communication of the events and types of events may be logged and automatically aggregated by the vehicle data information management system 302 from multiple vehicles (e.g., scooters 310a and 310b) for further analysis to determine various potential system-wide safety issues and to track event history on an individual per-user or individual per-vehicle basis or individual per-portable electrical energy storage device basis. Event history, statistics and related alerts may also be communicated wirelessly back to the user (e.g., to mobile device 310a) and displayed on the user's mobile device and/or scooter dash display (e.g., the dash display of scooter 310a). The same information may also be communicated wirelessly to a collection, charging and distribution machine (e.g., collection, charging and distribution machine 308a) and displayed on the collection, charging and distribution machine display. Such information may also be transferred accordingly via the portable electrical energy storage device exchange process at the online collection, charging and distribution machine (e.g., collection, charging and distribution machine 308a) through a memory device attached to the portable electrical energy storage device that stores the event data (e.g., see FIG. 3B).

FIG. 3B is a block diagram of the portable electrical energy storage device 106z of FIG. 1, according to one non-limiting illustrated embodiment.

Shown is a portable electrical energy storage device housing 320, electrical terminals 110a, 110b, a battery cell 304, event data storage system 306, a secure access panel 314 and an event data storage system connection port 318. The battery cell 304 is any rechargeable type of electrochemical cell that converts stored chemical energy into electrical energy. As described above, the electrical terminals 110a, 110b are accessible from an exterior of the portable electrical energy storage device 106z. The electrical terminals 110 allow charge to be delivered from the portable electrical energy storage device 106z, as well as allow charge to be delivered to the portable electrical energy storage device 106z for charging or recharging the same through conductive terminal connections 312a and 312b to the battery cell 304. While illustrated in FIG. 3B as posts, the electrical terminals 110a and 110b may take any other form which is accessible from an exterior of the portable electrical energy storage device 106z, including electrical terminals positioned within slots in the battery housing 320.

The event data storage system 306 is attached (fixedly or removably) directly or indirectly to an interior of the housing 320 and is operably coupled to the event data storage system connection port 318 via communications line 316 which travels through the housing 320 to the system connection port 318 that is accessible from the exterior of the portable electrical energy storage device 106z. The communications line 316 is configured to receive vehicle event data from external sources (e.g., a vehicle event detection system) through the event data storage system connection port 318 and communicate such data to the event data storage system 306 for storage in the event data storage system 306. For example, the communications line 316 is configured to receive vehicle event data from a vehicle while the portable electrical energy storage device 106z is operably installed in the vehicle. In other embodiments, the communications line 316 is configured to receive vehicle event data from a vehicle while the portable electrical energy storage device 106z is not operably installed in the vehicle. For example, the portable electrical energy storage device 106z may be connected via communications line 316 to an event detection system of the vehicle and be able to receive event data from the vehicle, while the electrical terminals 110 of the portable electrical energy storage device 106z are not operably connected to the vehicle (such as when the portable electrical energy storage device 106z is in the process of being installed or uninstalled, or is placed in the vehicle temporarily for the purpose of downloading vehicle event data, but not for powering the vehicle).

Such event data includes, but is not limited to, information regarding one or more of: an accident involving the vehicle, an emergency involving the vehicle, a breakdown of the vehicle, a catastrophic failure of the vehicle, a signal from a tilt sensor, a signal from a gravity sensor, a signal from an accelerometer, a signal from a shock sensor, temperature of the vehicle or vehicle components, temperature of a battery of the vehicle, temperature of a motor of the vehicle, temperature of an electronic component of the vehicle, data, signal or information from a temperature sensor, data, signal or information from a battery temperature sensor, dangerous temperature levels, temperature levels over or under one or more threshold temperatures, dangerous driving behavior, and one or more types of driving behaviors.

The event data storage system connection port 318 may be operably connected to a vehicle event detection system, an event detection system of the portable electrical energy storage device 106z, sensors of the vehicle and/or portable electrical energy storage device 106z (e.g., a tilt sensor, a gravity sensor, an accelerometer, a shock sensor, etc.) or may be configured to be operably connected to any number of vehicle subsystems configured to output event data regarding the particular corresponding vehicle subsystem. The event data storage system connection port 318 is configured to be compatible with one or more output ports of the respective vehicle event detection system or vehicle subsystem to which it is connected. In some embodiments, the event data storage system connection port 318 is operably coupled to a vehicle event detection system (e.g., the vehicle event detection system 418 shown in FIG. 4) as the portable electrical energy storage device 106z is operably placed or installed in the vehicle. For example, the event data storage system connection port 318 may be positioned on the exterior of the portable electrical energy storage device 106z housing 320 such that it aligns and connects with a corresponding output port of the vehicle event detection system 418 (shown in FIG. 4) when the portable electrical energy storage device 106z is properly placed or installed in the vehicle. The communications line 316 is also configured to send vehicle event data to external sources (e.g., a portable electrical energy storage device collection, charging and distribution machine 102, a mobile device, a server, etc.) from the event data storage system 306 through the event data storage system connection port 318.

The event data storage system 306 is operably coupled to the battery cell 304 via one or more power lines 322 in a manner such that the event data storage system 306 may receive power for operation of the event data storage system 306 to store vehicle event data. In other embodiments, the event data storage system 306 may receive power from other external sources or may be a system which does not require its own power to store the event data.

The access panel 314 is located on the housing 320 and is configured to provide access to the event data storage system 306 for inspection, diagnosis, replacement, and/or repair of the event data storage system 306 and/or any components of the event data storage system 306. The access panel 314 may also include a lock, be tamper resistant or include other security elements to limit access to the event data storage system 306. The access panel 314 may also include weather proofing components such as a seal or other protective components to protect the event data storage system 306 from external elements. In other embodiments, the event data storage system 306 may instead be fixedly or removably attached to an exterior of the housing 320. In such instances, the communications line would not travel through the housing 320. However, in such embodiments, the power line 322 to the battery cell 304, if present, would travel through the housing 320.

In some embodiments, the event data storage system 306 is configured to receive and/or send vehicle event data wirelessly to or from an external device. For example, the event data storage system 306 may be configured to receive vehicle event data wirelessly from the vehicle or external event detection system and/or send stored vehicle event data wirelessly to the portable electrical energy storage device collection, charging and distribution machine 102 or other remote device, such as a portable computer or smartphone. In such embodiments, the communications line 316 and the event data storage system connection port 318 may or may not be present as the event data storage system 306 may be configured to send and/or receive vehicle event data wirelessly instead of, or in addition to, being configured to send and/or receive vehicle event data via the communications line 316 and the event data storage system connection port 318.

The housing 320 is constructed of a polymer or other durable material of sufficient thickness to protect the battery cell 304 and event data storage system 306 from outside elements and tampering. For example the walls of the housing may be at least approximately 0.25 inch thick and completely surround the battery cell 304 and event data storage system 306 (except for, in some embodiments, a small vent hole in the housing) such that the battery cell 304 and event data storage system 306 cannot be accessed without a key or other specialized tool to open the locked access panel 314.

The housing 320 may provide a protection to prevent or deter tampering, and may be formed of suitably strong and resilient materials (e.g., ABS plastic). Such may not only prevent or deter tampering, but may leave a visible indication of any tampering attempts. For example, the housing 320 may include a strong outer layer of a first color (e.g., black) within an inner layer of a second color (e.g., fluorescent orange) there beneath. Such will render attempts to cut through the housing 320 visibly apparent.

Figure 4A:
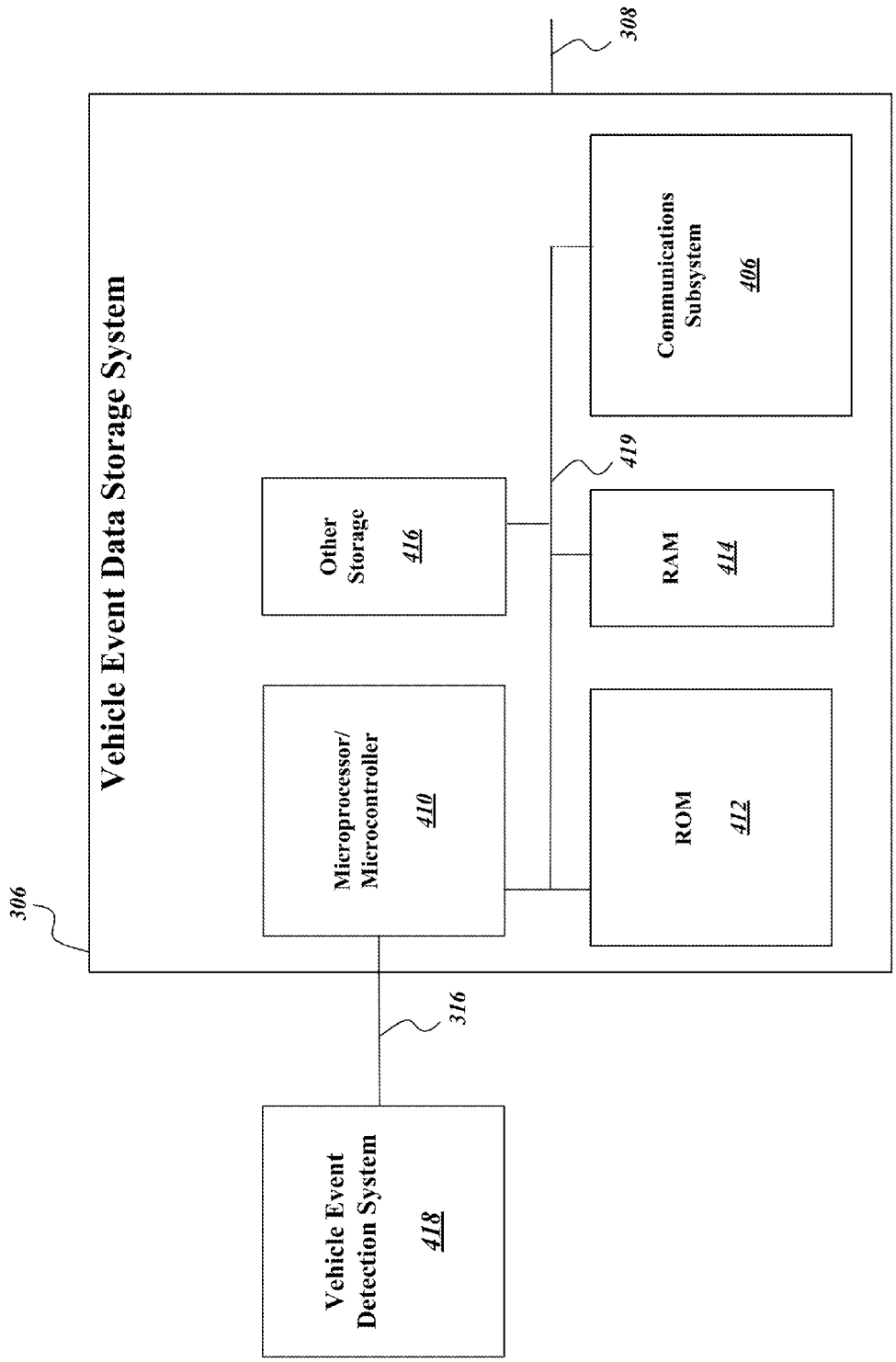
FIG. 4A is a schematic view of the vehicle event data storage system of FIG. 3B coupled to a vehicle event detection system, according to one non-limiting illustrated embodiment.

FIG. 4A is a schematic view of the event data storage system 306 of FIG. 3B coupled to a vehicle event detection system 418, according to one non-limiting illustrated embodiment.

The event data storage system 306 includes a controller 410, a communications subsystem 406, read only memory (ROM) 412, random access memory (RAM) 414 and other storage 416.

The controller 410, for example is a microprocessor, microcontroller, programmable logic controller (PLC), programmable gate array (PGA), application specific integrated circuit (ASIC) or another controller capable of receiving signals from various sensors, performing logical operations, and sending signals to various components. Typically, the controller 410 may take the form of a microprocessor (e.g., INTEL, AMD, ATOM). The event data storage system 306 may also include one or more non-transitory processor- or computer-readable storage media, for example read only memory (ROM) 412, random access memory (RAM) 414, and other storage 416 (e.g., solid-state storage media such as flash memory or EEPROM, spinning storage media such as hard disk). The non-transitory processor- or computer-readable storage media 412, 414, 416 may be in addition to any non-transitory storage medium (e.g., registers) which is part of the controller 410. The event data storage system 306 may include one or more buses 419 (only one illustrated) coupling various components together, for example one or more power buses, instruction buses, data buses, etc.

As illustrated, the ROM 412, or some other one of the non-transitory processor- or computer-readable storage media 412, 414, 416, stores instructions and/or data or values for variables or parameters. The sets of data may take a variety of forms, for example a lookup table, a set of records in a database, etc. The instructions and sets of data or values are executable by the controller 410. Execution of the instructions and sets of data or values causes the controller 410 to perform specific acts to cause the event data storage system 306 to receive, store and send vehicle event data, such as data received from the vehicle event detection system. The event data may be stored in one or more of the ROM 412, RAM 414 and other storage 416 in a variety of forms and formats including, but not limited to a lookup table, a set of records in a database, etc. The event data may be stored in a format, or converted to and then stored in a format in compliance with a standard format for vehicle event data or other format compatible or readable by various external devices. Information, including event data, could be stored initially at full fidelity, and then incrementally compressed as memory space becomes less. In some embodiments, diagnostically, the vehicle event data information management system 302 or other service center, such as that using the back end or back office systems 120, might require detailed collection of data at a specified interval. For example, the vehicle event data information management system 302 could know that a certain batch of motors was potentially made with a manufacturing defect that causes excessive vibration after some time. The vehicle event data information management system 302 could trace those motors to particular vehicles and request the accelerometer of those vehicles to collect the data at a rate suitable to determine if that particular vehicle was suffering from this early wear mechanism. The vehicle event data information management system 302 can request collection of certain types of data by the vehicle with selectable parameters (such as sampling rate) to aid in in-field diagnostics. Alternately, a government might request information on road quality using such a mechanism.

Figure 5:
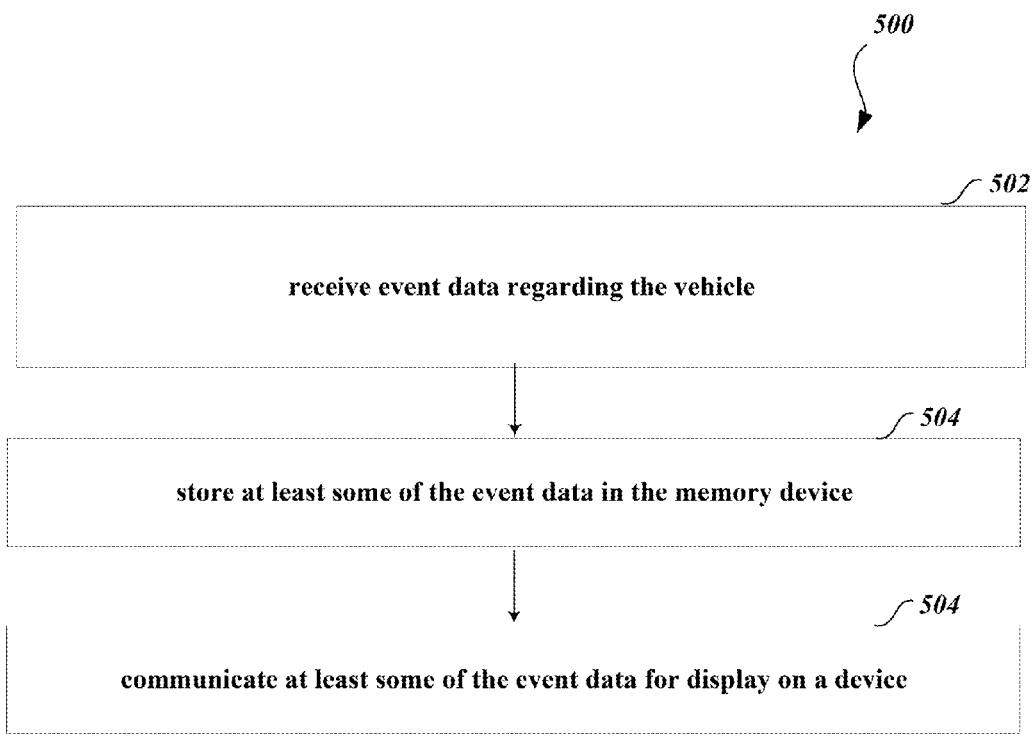
FIG. 5 is a flow diagram showing a method of operating the system for providing vehicle event data of FIGS. 3 and 4A, according to one non-limiting illustrated embodiment.
Figure 6:
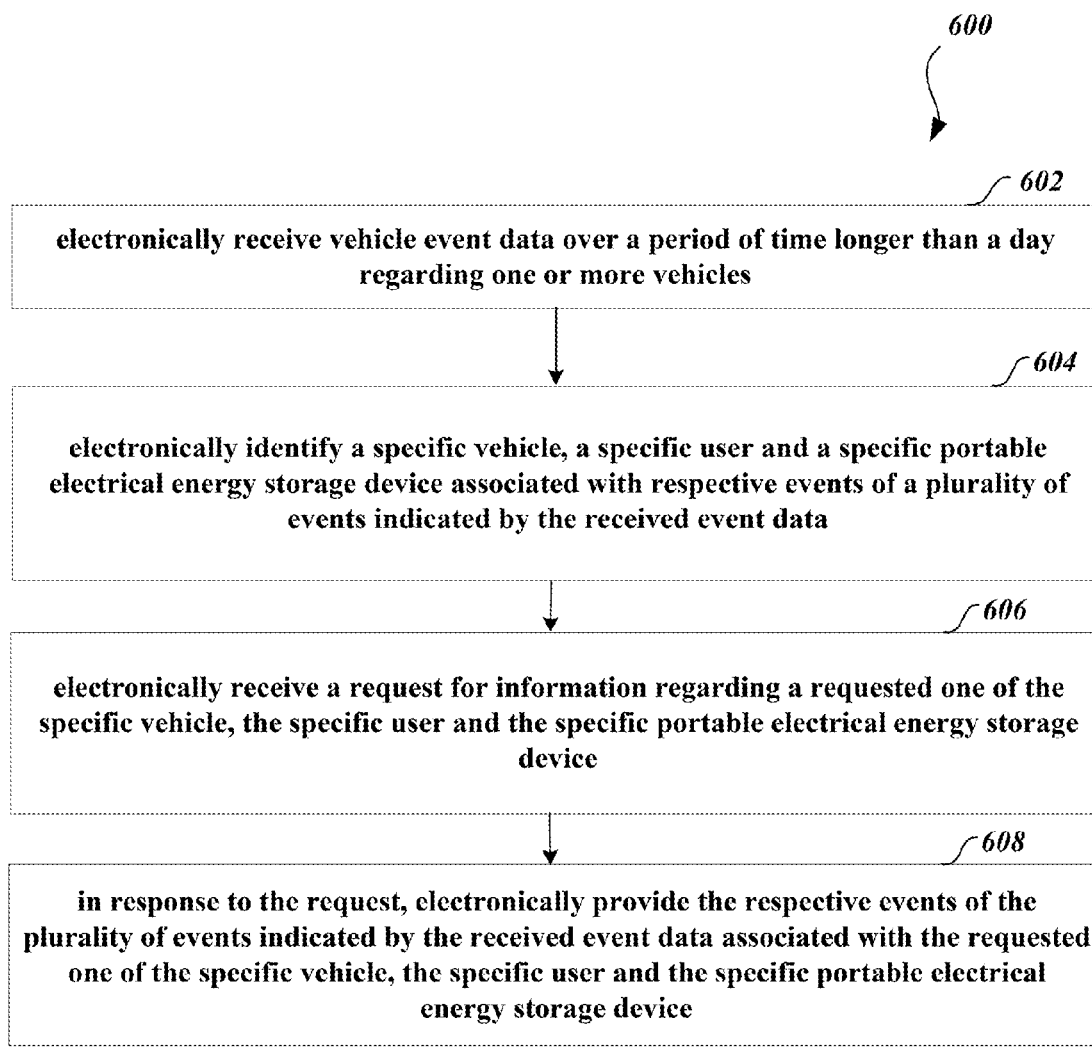
FIG. 6 is a flow diagram showing a method of operating the vehicle event data information management system of FIG. 3A, according to one non-limiting illustrated embodiment, including enabling data to be provided to an external device, useful in the method of FIG. 5.
Figure 7:
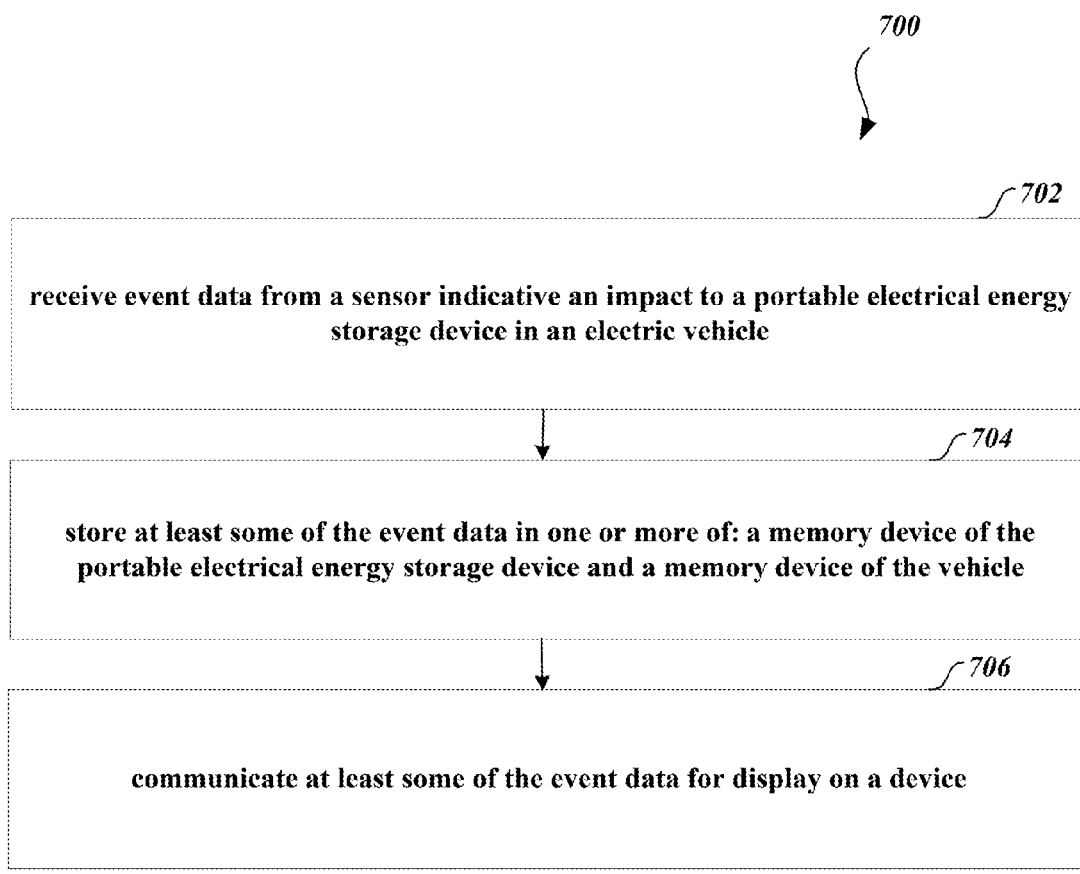
FIG. 7 is a flow diagram showing a method of communicating event data from a sensor indicative an impact to a portable electrical energy storage device in an electric vehicle, according to one non-limiting illustrated embodiment.

Also, various metadata related to the event data may also be stored in one or more of the ROM 412 and other storage 416, including but not limited to: associations or indications of associations of the event data with a particular vehicle, portable electrical energy storage device and/or user; date and time information associated with particular event data, vehicle information associated with the event data, categories or types of the event data, vehicle part information associated with parts needing replaced based on the event data, etc. Specific operation of the event data storage system 306 is described herein and also below with reference to various flow diagrams (FIGS. 5-7).

The controller 410 may use RAM 414 in a conventional fashion, for volatile storage of instructions, data, etc. The controller 410 may use data store 416 to log or retain vehicle event data, information regarding route information of user, historic data, etc. The instructions are executable by the controller 410 to control operation of the event data storage system 306 in response to input from remote and/or external systems such as those of external devices including but not limited to: the vehicle event detection system 418; charging devices; vehicles; user identification devices (cards, electronic keys, etc.); portable electrical energy device collection, charging and distribution machines; collection, charging and distribution machine service systems; user mobile devices; user vehicles; and end user or operator input.

The controller 410 may also receive signals from various sensors and/or components of an external device via the communications subsystem 206 of collection, charging and distribution machine 102. This information may include information that characterizes or is indicative of the authenticity, authorization level, operation, status, or condition of such components.

The communications subsystem 406 may include one or more communications modules or components which facilitates communications with the various components of external devices (e.g., such as to receive vehicle event data from the vehicle event detection system 418) and also the various components of the collection, charging and distribution machine 102 of FIG. 1 (e.g., such as to send vehicle event data) and one or more user mobile communication devices, such that data may be exchanged between the devices for authentication purposes. Such event data, software updates and data updates of user profile and/or vehicle profile information may include information received from or originating from (either directly or indirectly) an external device or system (e.g., a user's mobile device) or from other external systems such as via, collection charging and distribution machines, collection charging and distribution machine managements systems, other network nodes or locations, etc. These instructions and/or other data may include information that may be used to automatically adjust settings of the vehicle or make other modifications to the vehicle by the vehicle event detection system or other vehicle system when the corresponding electrical energy storage device is placed in or is in (or at which point it becomes in) communication with the vehicle via the communications subsystem 406.

The communications subsystem 406 may provide wired and/or wireless communications. The communications subsystem 406 may include one or more ports, wireless receivers, wireless transmitters or wireless transceivers to provide wireless signal paths to the various remote components or systems. The communications subsystem 406 may, for example, include components enabling short range (e.g., via Bluetooth, near field communication (NFC), radio frequency identification (RFID) components and protocols) or longer range wireless communications (e.g., over a wireless LAN, satellite, or cellular network) and may include one or more modems or one or more Ethernet or other types of communications cards or components for doing so. For wired communications, one example embodiment may include the communications subsystem 406 being configured to multiplex and communicate information over power lines of the vehicle 310a. In some embodiments which include wired communications, the physical layer transport for the wired communications may be implemented according to or based on the Society of Automotive Engineers' (SAE) J2931/3 specification (i.e., the J2931/3 standard). The SAE J2931/3 specification is generally intended to enable communication from an electric vehicle to service equipment such as a car charger via the charging cable. In one example embodiment, the J2931/3 standard, or other suitable standard, may be applied to communication of information from the Vehicle Event Data Storage System 306 of the portable electrical energy storage device 106z to the dashboard display of the vehicle 310a and/or mobile device 313 when the mobile device is plugged in the vehicle for charging without adding new wires. The communications subsystem 406 may include connections to one or more bridges or routers suitable to handle network traffic including switched packet type communications protocols (TCP/IP), Ethernet or other networking protocols.

The controller 410 may be also configured to receive information regarding the vehicle and/or user with which the vehicle event detection system 418 is associated and store the received event data accordingly. For example, event data for a variety of particular vehicles may be stored in ROM 412 by the processor and associated with the corresponding vehicle in metadata stored in ROM 412. The controller 410 may be configured to receive requests for the event data from various external devices, and in response, provide such requested data, or indicate that such data is not available. In some embodiments, the controller 410 may be configured to perform search, edit, sort, delete and other database functionalities to manage the stored vehicle event data and identify and retrieve particular requested vehicle event data.

The controller 410 may be configured to identify or authenticate various external devices before providing such vehicle event data by verifying codes, credentials or other information received from external devices with stored information. In some embodiments, the controller and/or communications subsystem 406 is configured to encrypt and/or decrypt information communicated between the event data storage system 306 and external devices (e.g., between the event data storage system 306 and the portable electrical energy storage device collection, charging and distribution machine 102 or user mobile device). In some embodiments, the vehicle event data storage system 306 may optionally include cryptographic hardware operably coupled to the controller 410 that can maintain keys, encrypt information and provide secure hashing functions. For example, cryptographic hardware can optionally encrypt and/or sign data with public keys from other entities or from itself. The cryptographic hardware may securely store keys in a tamper-proof fashion. This ensures that sensitive data can be moved securely between the vehicle 310a and any of the collection, charging and distribution machines 308a to 308c, for example, via the portable electrical energy storage device 106z when it is placed in any one of the collection, charging and distribution machines 308a to 308c. In this manner, the sensitive data is not susceptible to modification or inspection by an external entity unless authorized. This allows, for example, a remote server, such as the vehicle event data information system 302 or other remote server to use its private key and the public key of the vehicle 310a to change configurations on the vehicle 310a, which might include sensitive information related to subscription and access to value-added services.

In some embodiments, some of the components of the event data storage system 306 shown in FIG. 4A may not be present or may be located outside the event data storage system 306. For example, in some embodiments, the event data storage system 306 may comprise a memory device such as the ROM 412 configured to store vehicle event data while the other components shown in FIG. 4A (e.g., the controller 410 and communications subsystem 406) are not present or are located outside the event data storage system 306 (e.g., are instead part of the vehicle event detection system 418).

The vehicle event detection system 418 may be one or more event detection systems of a vehicle and/or portable electrical energy storage device and is configured to track and/or store and communicate vehicle event data. The vehicle event detection system 418 may include one or more sensors to detect events involving the vehicle and/or portable electrical energy storage device including, but not limited to, one or more of: a tilt sensor, a gravity sensor, an accelerometer, a shock sensor, etc. Such event data includes, but is not limited to, information regarding one or more of: an accident involving the vehicle, an emergency involving the vehicle, a breakdown of the vehicle, a catastrophic failure of the vehicle, a signal from a tilt sensor, a signal from a gravity sensor, a signal from an accelerometer, a signal from a shock sensor, temperature of the vehicle or vehicle components, temperature of a battery of the vehicle, temperature of a motor of the vehicle, temperature of an electronic component of the vehicle, data, signal or information from a temperature sensor, data, signal or information from a battery temperature sensor, dangerous temperature levels, temperature levels over or under one or more threshold temperatures, dangerous driving behavior, and one or more types of driving behaviors.

The power line 322 is configured to provide power for operation of one or more of the various components of the event data storage system including the controller 410, a communications subsystem 406, read only memory (ROM) 412, random access memory (RAM) 414 and other storage 416. For example, the power line 322 may be operably coupled to a power source such as the battery cell 304 of the portable electrical energy storage device 106z (as shown in FIG. 3B) and/or another power source located in the vehicle.

Figure 4B:
FIG. 4B is an illustration of example information displayed on a user interface screen regarding vehicle event data received from the vehicle event data information management system of FIG. 3A and/or the vehicle event data storage system of FIG. 3B and FIG. 4A, according to one non-limiting illustrated embodiment.

FIG. 4B is an illustration of example information displayed on a user interface screen 420 regarding vehicle event data received from the event data storage system 306 of FIG. 3B and FIG. 4A, according to one non-limiting illustrated embodiment.

For example, the information shown in FIG. 4B may be displayed on a user interface screen of the user's mobile device 310a, the vehicle dashboard display of the user's vehicle (e.g., vehicle 310a) and/or on the display of the portable electrical energy storage device collection, charging and distribution machine 102 after the user places the portable electrical energy storage device 106z in the portable electrical energy storage device collection, charging and distribution machine 102. In one embodiment, once the user places the portable electrical energy storage device 106z in the portable electrical energy storage device collection, charging and distribution machine 102, a connection is established between the portable electrical energy storage device collection, charging and distribution machine 102 and the portable electrical energy storage device 106z (wirelessly and/or via the via the event data storage system connection port 318). The portable electrical energy storage device collection, charging and distribution machine 102 then reads vehicle event data stored on the event data storage system 306 of the portable electrical energy storage device 106z and provides information regarding the event data to the user. FIG. 4B shows one example of providing such information regarding the event data read from the event data storage system 306 of the portable electrical energy storage device 106z. For example, shown in FIG. 4B is a vehicle event report displaying a report regarding the event detected and a series of prompts 426 to make sure the user is not injured and regarding the vehicle condition to assess what further information to provide to the user. This information is provided based on the event data read from the vehicle accelerometer indicating an impact had occurred. Different or additional information may be displayed based on the degree or severity of impact detected. Additional related information may be provided including, but not limited to: information that may be useful in resolving an identified potential problem, instructional information regarding resolving an identified problem, location information of where to locate replacement vehicle parts, emergency services contact information, emergency dispatch service information, time remaining until emergency services arrive, etc. Also shown is a selectable button or icon 428 that the user may select to acknowledge the user has seen the information and to continue to a next screen or quit.

The information shown in FIG. 4B may be displayed on a screen of the portable electrical energy storage device collection, charging and distribution machine 102 or otherwise communicated to a user as part of, or independently from, the process of exchanging or returning a portable electrical energy storage device 106z at the portable electrical energy storage device collection, charging and distribution machine 102 by the user. For example, a user may stop at the portable electrical energy storage device collection, charging and distribution machine 102 solely to check on the status or condition of the vehicle by obtaining information regarding the vehicle event data stored on the event data storage system 306 without needing to exchange, drop off or even remove the portable electrical energy storage device 106z from the vehicle in some embodiments (such as in embodiments where the vehicle event data is communicated wirelessly from the event data storage system 306 to the portable electrical energy storage device collection, charging and distribution machine 102).

In some embodiments, the information shown in FIG. 4B may be displayed on a user interface screen 420 of a mobile device of a user associated with the vehicle currently using (or that had previously used) the portable electrical energy storage device 106z. For example, once within wireless communications range of the event data storage system 306, the event data storage system 306 may authenticate the wireless mobile device and automatically push the stored vehicle event data to the mobile device or upon request from the mobile device for the vehicle event data. The event data storage system 306 may also authenticate the user associated with the mobile device as being a user associated with the vehicle and/or the event data storage system 306. For example, such authentication information regarding the association of the user with the vehicle and/or the event data storage system 306 may be communicated to the event data storage system 306 from the portable electrical energy storage device collection, charging and distribution machine 102 when the portable electrical energy storage device 106z having the event data storage system 306 is retrieved from the portable electrical energy storage device collection, charging and distribution machine 102 by the user who has been identified by the portable electrical energy storage device collection, charging and distribution machine 102.

Once the portable electrical energy storage device 106z is placed in the portable electrical energy storage device collection, charging and distribution machine 102 in the process of a user returning or exchanging the portable electrical energy storage device 106z at the portable electrical energy storage device collection, charging and distribution machine 102, and the information regarding the vehicle event data has been provided to the user or otherwise utilized, the portable electrical energy storage device collection, charging and distribution machine 102 may initiate a deletion of the vehicle event data from the event data storage system 306 or cause the stored vehicle identification data to be able to be overwritten (e.g., to make room for storage of vehicle event data of other vehicles in which the portable electrical energy storage device 106z will be used). In some embodiments, the currently stored vehicle event data may be deleted or caused to be able to be overwritten by the event data storage system 306 or vehicle event detection system 418 upon re-connection of the event data storage system 306 to the vehicle event detection system 418, or upon connection to a different vehicle than that which is associated with the currently stored vehicle event data on the event data storage system 306.

FIG. 5 is a flow diagram showing a method 500 of operating the system for providing vehicle event data of FIGS. 3 and 4A, according to one non-limiting illustrated embodiment.

At 502, the system for providing vehicle event data receives event data regarding the vehicle.

At 504, the system for providing vehicle event data stores at least some of the event data in the memory device.

At 506, the system for providing vehicle event data communicates at least some of the event data for display on a device.

FIG. 6 is a flow diagram showing a method 600 of operating the vehicle event data information management system of FIG. 3A, according to one non-limiting illustrated embodiment, including enabling data to be provided to an external device, useful in the method of FIG. 5.

At 602, the vehicle event data information management system electronically receives vehicle event data over a period of time longer than a day regarding one or more vehicles.

At 604, the vehicle event data information management system electronically identifies a specific vehicle, a specific user and a specific portable electrical energy storage device associated with respective events of a plurality of events indicated by the received event data.

At 606, the vehicle event data information management system electronically receives a request for information regarding a requested one of the specific vehicle, the specific user and the specific portable electrical energy storage device.

At 608, the vehicle event data information management system, in response to the request, electronically provides the respective events of the plurality of events indicated by the received event data associated with the requested one of the specific vehicle, the specific user and the specific portable electrical energy storage device.

FIG. 7 is a flow diagram showing a method 700 of communicating event data received from a sensor indicative of an impact to a portable electrical energy storage device in an electric vehicle, according to one non-limiting illustrated embodiment.

At 702, the system for providing vehicle event data receives event data from a sensor indicative of an impact to a portable electrical energy storage device in an electric vehicle.

At 704, the system for providing vehicle event data stores at least some of the event data in one or more of: a memory device of the portable electrical energy storage device and a memory device of the vehicle.

At 706, the system for providing vehicle event data communicates at least some of the event data for display on a device.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via one or more microcontrollers. However, those skilled in the art will recognize that the embodiments disclosed herein, in whole or in part, can be equivalently implemented in standard integrated circuits (e.g., Application Specific Integrated Circuits or ASICs), as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and/or firmware would be well within the skill of one of ordinary skill in the art in light of the teachings of this disclosure.

When logic is implemented as software and stored in memory, logic or information can be stored on any non-transitory computer-readable medium for use by or in connection with any processor-related system or method. In the context of this disclosure, a memory is a nontransitory computer- or processor-readable storage medium that is an electronic, magnetic, optical, or other physical device or means that non-transitorily contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any physical element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

Aspects of the embodiments can be modified, if necessary, to employ systems, circuits and concepts of the various patents, applications and publications to provide yet further embodiments. While generally discussed in the environment and context of collection, charging and distribution of portable electrical energy storage devices for use with personal transportation vehicle such as all-electric scooters and/or motorbikes, the teachings herein can be applied in a wide variety of other environments, including other vehicular as well as non-vehicular environments.

The above description of illustrated embodiments, including what is described in the Abstract of the Disclosure, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A method in a vehicle event data processing system comprising, the method comprising:
   electronically receiving, by a processor of vehicle event data system, vehicle event data over a period of time longer than a day regarding one or more vehicles;
   electronically identifying, by a processor of the vehicle event data system, a specific vehicle, a specific user and a specific portable electrical energy storage device associated with respective events of a plurality of events indicated by the received event data;
   electronically receiving a request for information regarding a requested one of the specific vehicle, the specific user and the specific portable electrical energy storage device; and
   in response to the request, electronically displaying on a display device, by a processor of vehicle event data system, the respective events of the plurality of events indicated by the received event data associated with the requested one of the specific vehicle, the specific user and the specific portable electrical energy storage device.

2. The method of claim 1 further comprising:
   electronically detecting, by a processor of the vehicle event data system, a pattern of safety problems regarding one or more of: a specific vehicle, a specific user and a specific portable electrical energy storage device associated with the respective events of the plurality of events based on the identification of the specific vehicle, the specific user and the specific portable electrical energy storage device associated with the respective events of the plurality of events indicated by the received event data.

3. The method of claim 2 further comprising: electronically communicating, by a processor of the vehicle event data system, information regarding the detected pattern of safety problems regarding the one or more of the specific vehicle, the specific user and the specific portable electrical energy storage device associated with the respective events of the plurality of events to a remote device.

4. The method of claim 2 wherein the detected pattern of safety problems is regarding the specific portable electrical energy storage device and wherein the method further comprises electronically determining, by a processor of the vehicle event data system, a change to make regarding distribution of the specific portable electrical energy storage device to collection, charging and distribution machines based on the detected pattern of safety problems regarding the portable electrical energy storage device.

5. The method of claim 1 further comprising:
   receiving a request for collection of a certain type of data by the vehicle with selectable parameters to aid in in-field diagnostics of the vehicle; and
   in response to the request, providing the certain type of data according to the selectable parameters.

6. The method of claim 1 wherein the remote device is a mobile device of the specific user.

7. A non-transitory computer readable storage medium having computer executable instructions thereon that, when executed, cause a processor of a vehicle event data system to:
   receive event data from a sensor indicative of an impact to a portable electrical energy storage device in an electric vehicle;
   store at least some of the event data in one or more of a memory device of the portable electrical energy storage device and a memory device of the vehicle;
   communicate at least some of the event data for display on a device
   electronically receive vehicle event data over a period of time longer than a day regarding the electric vehicle;
   electronically identify a specific user and a specific portable electrical energy storage device associated with respective events of a plurality of events indicated by the vehicle event data regarding the electric vehicle received over the period of time; and
   display on a display device information regarding the identification of the specific user and the specific portable electrical energy storage device associated with the respective events of the plurality of events to a remote device.

* * * * *